(12) United States Patent
Nakamura

(10) Patent No.: US 9,310,672 B2
(45) Date of Patent: *Apr. 12, 2016

(54) STEREOSCOPIC IMAGE CAPTURING DEVICE AND METHOD OF CONTROLLING THEREOF

(71) Applicant: FUJIFILM Corporation, Tokyo (JP)

(72) Inventor: Satoshi Nakamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 648 days.

This patent is subject to a terminal disclaimer.

(21) Appl. No.: 13/659,552

(22) Filed: Oct. 24, 2012

(65) Prior Publication Data

US 2013/0050439 A1 Feb. 28, 2013

Related U.S. Application Data

(63) Continuation of application No. PCT/JP2011/059911, filed on Apr. 22, 2011.

(30) Foreign Application Priority Data

Apr. 28, 2010 (JP) .................................. 2010-103904

(51) Int. Cl.
*H04N 13/04* (2006.01)
*G03B 35/08* (2006.01)
(Continued)

(52) U.S. Cl.
CPC .............. *G03B 35/08* (2013.01); *G06T 7/0022* (2013.01); *H04N 13/0022* (2013.01);
(Continued)

(58) Field of Classification Search
CPC . H04N 19/105; H04N 19/154; H04N 19/176; H04N 19/196; H04N 19/197; H04N 19/198; H04N 19/593; H04N 19/60; H04N 19/63; H04N 13/0022; H04N 13/0239; H04N 13/0242; H04N 13/04; H04N 13/0402; H04N 13/0429; H04N 13/0011; H04N 13/0029; H04N 13/0066
USPC ....................................................... 375/240.16
See application file for complete search history.

(56) References Cited

U.S. PATENT DOCUMENTS 5,726,704 A * 3/1998 Uomori .............. H04N 13/0014
348/47
6,005,607 A * 12/1999 Uomori .............. H04N 13/0278
345/32

(Continued)

FOREIGN PATENT DOCUMENTS

CN 1788497 A 6/2006
JP 2004-180069 A 6/2004

(Continued)

OTHER PUBLICATIONS

Notice of Reasons for Rejection dated Sep. 3, 2014, issued in corresponding Chinese Patent Application No. 2011800320925.7.

(Continued)

*Primary Examiner* — Tung Vo
(74) *Attorney, Agent, or Firm* — Birch, Stewart, Kolasch & Birch, LLP

(57) ABSTRACT

Feature points are extracted from left and right viewpoint images (Step S12), and the amount of parallax of each feature point is calculated (Step S13). The maximum amount of parallax on a near view side and the maximum amount of parallax on a distant view side are acquired from the calculated amount of parallax of each feature point (Step S14). The maximum display size which enables binocular fusion from a supposed visual distance when a stereoscopic image based on the left and right viewpoint images is displayed on a stereoscopic display is acquired on the basis of at least the maximum amount of parallax on the distant view side (Step S15). The acquired maximum display size is recorded along with image information (Step S16). The image reproduction device which reads the 3D image file recorded in this way can be appropriately displayed on the basis of the maximum display size.

4 Claims, 31 Drawing Sheets

(51) Int. Cl.
*G06T 7/00* (2006.01)
*H04N 13/00* (2006.01)
*H04N 13/02* (2006.01)

(52) U.S. Cl.
CPC ...... *H04N 13/0066* (2013.01); *H04N 13/0239* (2013.01); *H04N 13/04* (2013.01); *H04N 13/0011* (2013.01); *H04N 13/0029* (2013.01); *H04N 13/0242* (2013.01); *H04N 13/0402* (2013.01); *H04N 13/0429* (2013.01); *H04N 2013/0081* (2013.01)

(56) References Cited

U.S. PATENT DOCUMENTS

| | | | | |
|---|---|---|---|---|
| 6,549,650 B1* | 4/2003 | Ishikawa | | G02B 27/2264 345/419 |
| 6,864,910 B1* | 3/2005 | Ogino | | H04N 13/021 348/42 |
| 7,463,257 B2* | 12/2008 | Martin | | H04N 13/0011 345/419 |
| 7,605,776 B2* | 10/2009 | Satoh | | H04N 13/0003 345/7 |
| 7,636,088 B2* | 12/2009 | Nomura | | H04N 13/0022 345/419 |
| 7,652,665 B2* | 1/2010 | Fukushima | | H04N 13/0022 345/419 |
| 7,889,196 B2* | 2/2011 | Nomura | | H04N 13/0022 345/419 |
| 8,208,008 B2* | 6/2012 | Oota | | G03B 35/08 348/42 |
| 8,243,121 B2* | 8/2012 | Nakamura | | H04N 1/2166 348/239 |
| 8,390,674 B2* | 3/2013 | Kim | | G06K 9/00604 345/419 |
| 8,482,600 B2* | 7/2013 | Lee | | H04N 5/23212 348/42 |
| 8,736,671 B2* | 5/2014 | Nakamura | | H04N 13/0022 348/43 |
| 2006/0192776 A1* | 8/2006 | Nomura | | H04N 13/0022 345/419 |
| 2007/0257902 A1 | 11/2007 | Satoh et al. | | |
| 2009/0122134 A1 | 5/2009 | Joung et al. | | |
| 2010/0039499 A1* | 2/2010 | Nomura | | H04N 13/0022 348/43 |
| 2011/0007131 A1 | 1/2011 | Okada et al. | | |
| 2013/0044188 A1* | 2/2013 | Nakamura | | H04N 13/0066 348/46 |
| 2013/0050439 A1* | 2/2013 | Nakamura | | G03B 35/08 348/50 |
| 2013/0093859 A1* | 4/2013 | Nakamura | | H04N 13/0022 348/51 |
| 2013/0170737 A1* | 7/2013 | Arita | | H04N 13/0022 382/154 |
| 2013/0308917 A1* | 11/2013 | Nakamura | | G03B 35/08 386/224 |
| 2013/0315558 A1* | 11/2013 | Nakamura | | H04N 9/87 386/230 |
| 2013/0342654 A1* | 12/2013 | Nakamura | | G02B 27/22 348/46 |

FOREIGN PATENT DOCUMENTS

| | | |
|---|---|---|
| JP | 2004-334833 A | 11/2004 |
| JP | 2005-167310 A | 6/2005 |
| JP | 2008-109267 A | 5/2008 |

OTHER PUBLICATIONS

International Search Report issued in PCT/JP2011/059911 mailed Jul. 19, 2011.

Office Action in co-pending U.S. Appl. No. 13/949,707 mailed Nov. 5, 2015.

\* cited by examiner

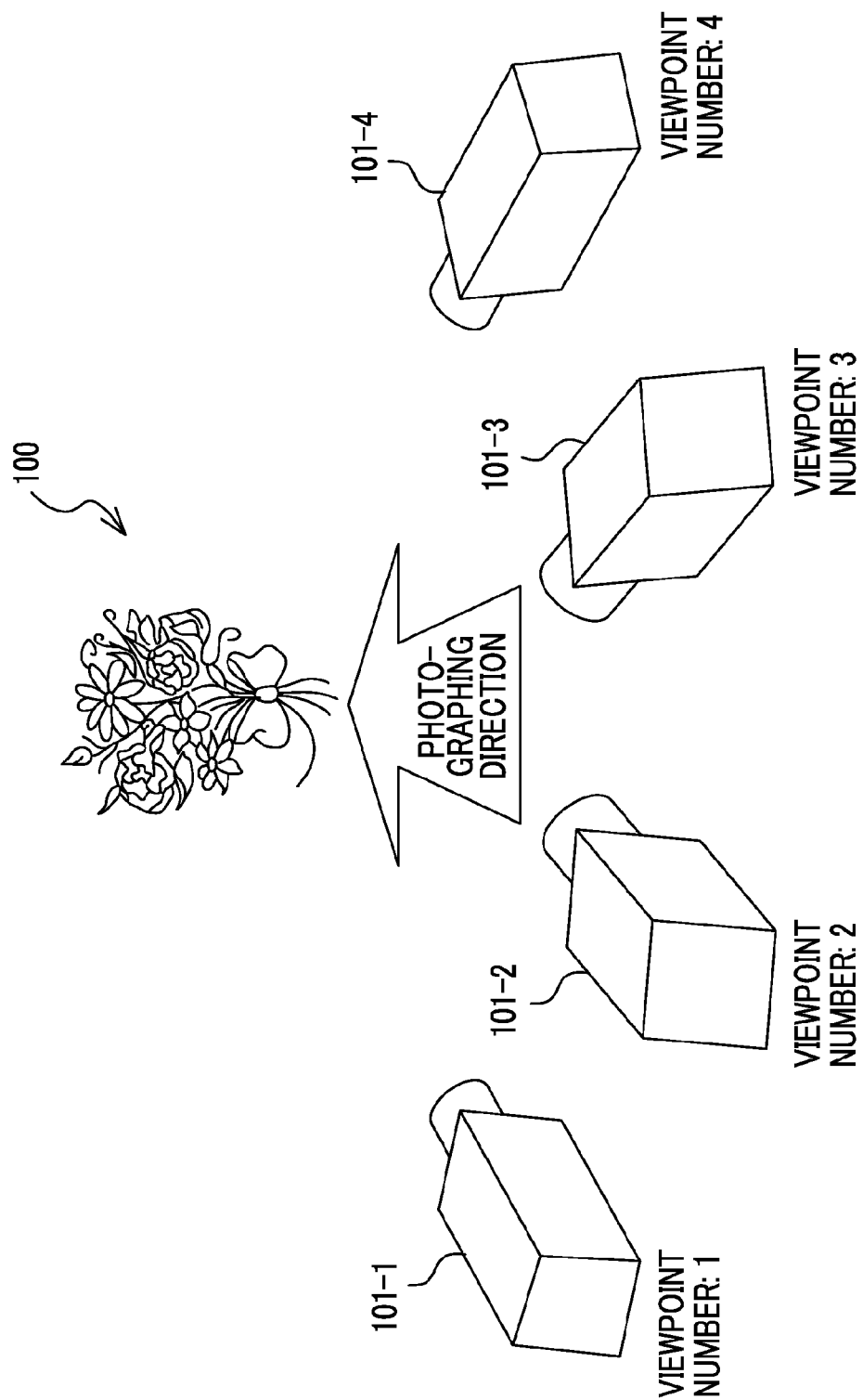

(CONT.)

(CONT.)

(CONT.)

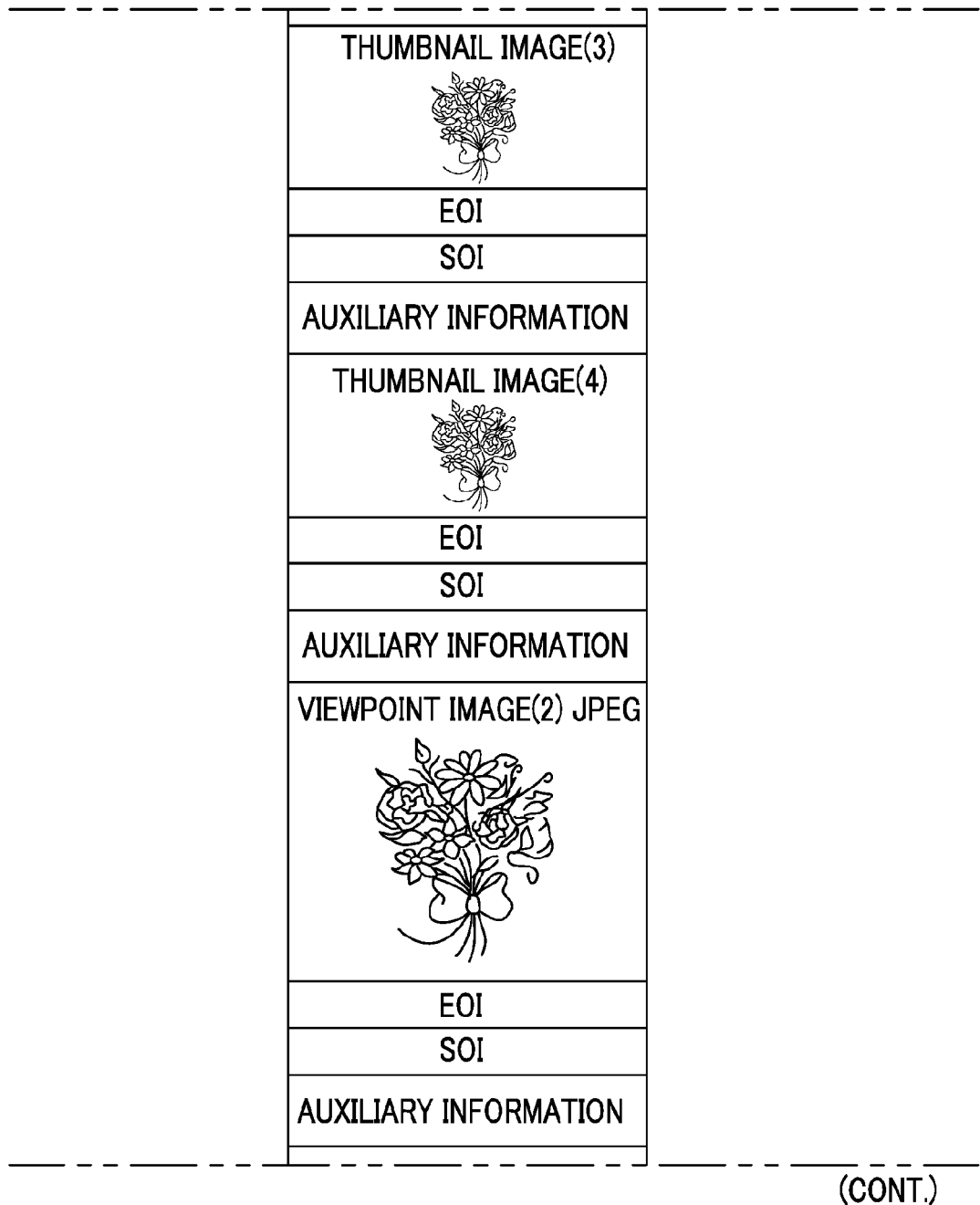

| SOI |
| AUXILIARY INFORMATION |
| VIEWPOINT IMAGE(1) JPEG |
| EOI |
| SOI |
| AUXILIARY INFORMATION |
| THUMBNAIL IMAGE(1) |
| EOI |
| SOI |
| AUXILIARY INFORMATION |
| THUMBNAIL IMAGE(3) |
| EOI |
| SOI |
| AUXILIARY INFORMATION |

(CONT.)

(CONT.)

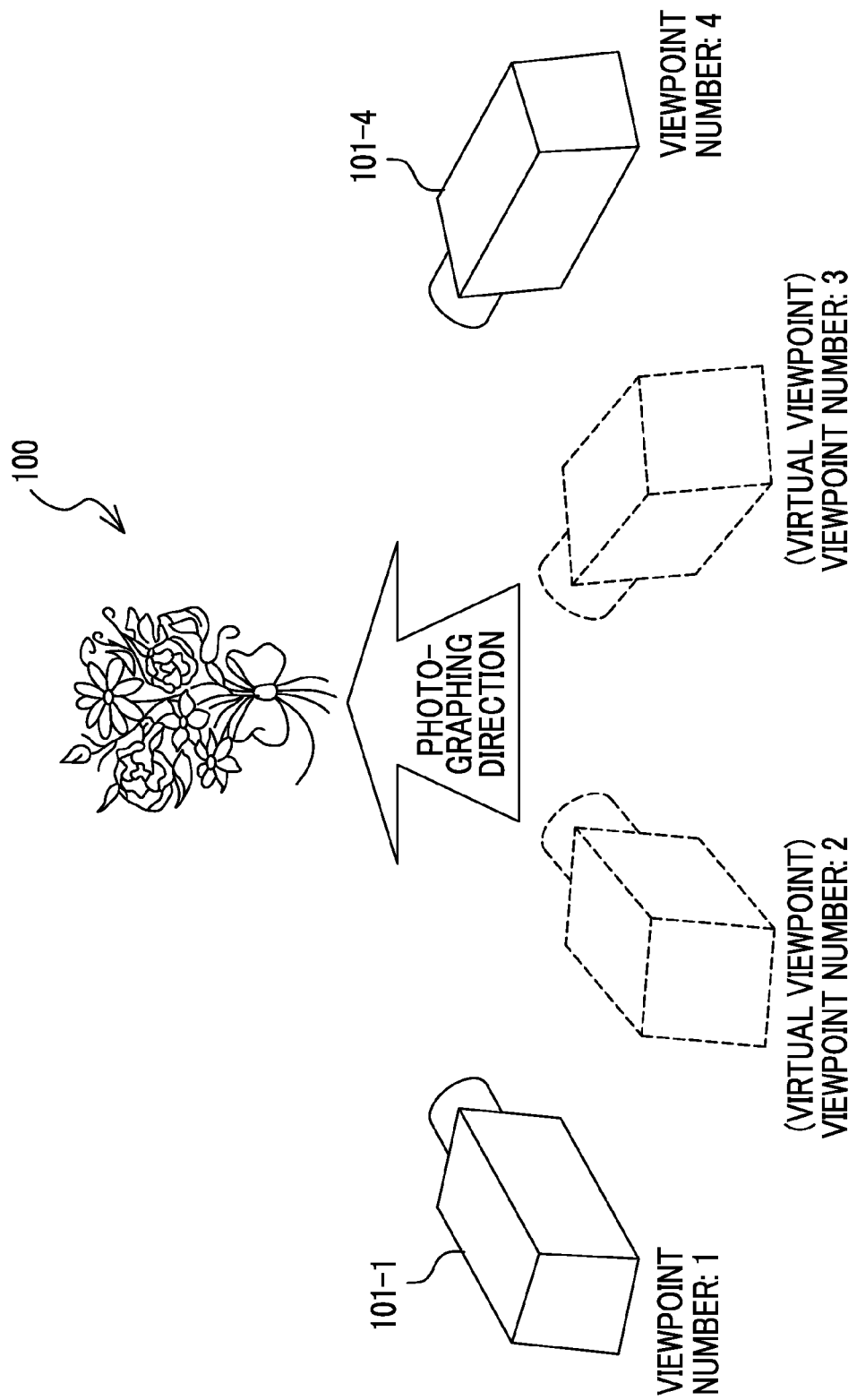

| AUXILIARY INFORMATION | MAXIMUM AMOUNT OF PARALLAX |
|---|---|
| VIEWPOINT IMAGE(1)  | |
| AUXILIARY INFORMATION | VIEWPOINT 2: SHIFTED<br>SHIFT AMOUNT=xxx |
| VIEWPOINT SHIFT IMAGE(2)  | |
| AUXILIARY INFORMATION | MAXIMUM AMOUNT OF PARALLAX |
| THUMBNAIL IMAGE(1)  | |
| AUXILIARY INFORMATION | |
| THUMBNAIL IMAGE(2)  | |
| AUXILIARY INFORMATION | MAXIMUM AMOUNT OF PARALLAX |
| ORIGINAL IMAGE (1) 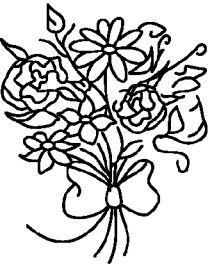 | |
| AUXILIARY INFORMATION | |
| ORIGINAL IMAGE (2) 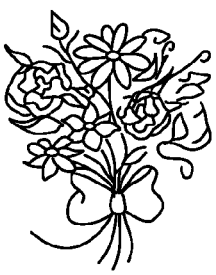 | |

STEREOSCOPIC IMAGE CAPTURING DEVICE AND METHOD OF CONTROLLING THEREOF

CROSS REFERENCE TO RELATED APPLICATIONS

This application is a Continuation of PCT International Application No. PCT/JP2011/059911 filed on Apr. 22, 2011, which claims the benefit to Patent Application No. 2010-103904 filed in Japan, on Apr. 28, 2010. The entire contents of all of the above applications are hereby incorporated by reference.

BACKGROUND OF THE INVENTION

1. Field of the Invention

The present invention relates to a stereoscopic image capturing device and a method of controlling thereof, and in particular, to a technique for recording a plurality of viewpoint images in one three-dimensional image file.

2. Description of the Related Art

A stereoscopic image capturing device photographs the same subject from left and right viewpoints using two image capturing unit arranged left and right with parallax, acquires an image for a left eye and an image for a right eye, and records the images in a recording medium. The acquired left and right images are read from the recording medium, are input to a 3D display which can perform three-dimensional (3D) display, and are displayed such that the image for the left eye and the image for the right eye are visible separately with the left and right eyes. In this way, the images can be recognized as a stereoscopic image.

On the other hand, the 3D displays have various screen sizes, and the amount of parallax of the recorded left and right image may not be appropriate for the size of the 3D display on which the left and right images are reproduced and displayed. In this case, the degree of protrusion or recession becomes excessive, and there is a problem in that the images may not be recognized as a natural stereoscopic image.

In order to solve this problem, JP2004-180069A discloses a technique in which cross point (CP) information regarding the distance between a cross point at which the optical axes of two image capturing units acquiring left and right images cross each other and parallax is zero and an image capturing device is utilized, and the amount of parallax of the left and right images is adjusted during reproduction, thereby adjusting a stereoscopic effect of video to be displayed. According to this technique, even when reproduction is performed in display devices which are different in screen size, stereoscopic video with a natural amount of protrusion can be constantly obtained.

SUMMARY OF THE INVENTION

However, in the technique of JP2004-180069A, since the amount of the parallax of the left and right images is adjusted depending on the screen size during reproduction, there is a drawback in that processing in the image reproduction device is complicated.

The invention has been accomplished in consideration of this situation, and an object of the invention is to provide a stereoscopic image capturing device and a method of controlling a stereoscopic image capturing device which reduce processing for adjusting the amount of parallax depending on a screen size when a stereoscopic image is reproduced in an image reproduction device as much as possible.

In order to attain the above-described object, a stereoscopic image capturing device according to a first aspect of the invention includes image capturing unit for acquiring a plurality of viewpoint images of the same subject from a plurality of viewpoints, parallax amount calculation unit for calculating the amount of parallax representing the amount of deviation between feature points having common features from the plurality of acquired viewpoint images, maximum parallax amount acquisition unit for acquiring the maximum amount of parallax on a distant view side from the calculated amount of parallax of each feature point, maximum display size acquisition unit for acquiring the maximum display size enabling binocular fusion when a stereoscopic image based on the plurality of viewpoint images is displayed on a stereoscopic display on the basis of the acquired maximum amount of parallax on the distant view side, and recording unit for generating a three-dimensional image file in which the plurality of viewpoint images are recorded, and recording the three-dimensional image file in a recording medium, the recording unit recording the plurality of viewpoint images in the three-dimensional image file and recording the maximum amount of parallax on the distant view side and the maximum display size in the three-dimensional image file as auxiliary information. The term "distant view side" used herein refers to a distal side away from the image capturing unit toward the subject, and the term "near view side" refers to a proximal side close to the image capturing unit from the subject contrary to the distal side.

According to the stereoscopic image capturing device having the above-described configuration, the amount of parallax representing the amount of deviation between the feature points having common features is calculated from the plurality of acquired viewpoint images, the maximum amount of parallax on the distant view side from the calculated amount of parallax of each feature point is acquired, the maximum display size is acquired on the basis of the maximum amount of parallax on the distant view side, and the maximum amount of parallax on the distant view side and the maximum display size are recorded in the three-dimensional image file as the auxiliary information. For this reason, when the three-dimensional image file is read in the image reproduction device, the maximum display size recorded in the auxiliary information is compared with the display size of the stereoscopic display for display, thereby easily determining whether or not stereoscopic vision is appropriately possible. Therefore, when it is determined that stereoscopic vision is possible, it should suffice that the recorded images are displayed directly, and the processing for adjusting the amount of parallax depending on the screen size in the reproduction device can be reduced.

In the stereoscopic image capturing device according to the first aspect of the invention, it is preferable that the recording unit further record, as the auxiliary information, the number of times of photographing when a supposed visual distance which is a supposed distance and the distance between a viewer CB-STB6 who is appropriate to observe the stereoscopic image and the stereoscopic display, and the plurality of viewpoint images are acquired.

Accordingly, even when the amount of parallax is adjusted in the image reproduction device, the amount of parallax can be appropriately adjusted.

In the stereoscopic image capturing device according to the first aspect of the invention, it is preferable that the maximum parallax amount acquisition unit acquire the maximum amount of parallax on a near view side from the calculated amount of parallax of each feature point, the maximum display size acquisition unit acquire the maximum display size which enables binocular fusion when a stereoscopic image based on the plurality of viewpoint images is displayed on the stereoscopic display on the basis of the acquired maximum amount of parallax on the near view side, and the recording unit record the acquired maximum amount of parallax on the near view side in the three-dimensional image file as the auxiliary information.

Accordingly, the maximum display size of which stereoscopic vision is possible can be appropriately determined on the near view side.

It is preferable that the stereoscopic image capturing device according to the first aspect of the invention further include representative image setting unit for setting one of N (N is an integer equal to or greater than 3) viewpoint images acquired by the image capturing unit as a representative image, wherein the maximum parallax amount acquisition unit acquires the (N−1) maximum amount of parallax on the distant view side in association with two images of different combinations of the representative image and (N−1) viewpoint images other than the representative image from the N images, the maximum display size acquisition unit acquire (N−1) maximum display sizes on the basis of the acquired (N−1) maximum amount of parallax on the distant view side, and the recording unit records the acquired (N−1) maximum amount of parallax and maximum display sizes on the distant view side in the three-dimensional image file as the auxiliary information.

Accordingly, the (N−1) maximum display sizes can be referenced in the image reproduction device, and by comparison with the display size for display, and images appropriate for stereoscopic vision can be simply selected. When adjusting the amount of parallax, if the maximum amount of parallax of each image is read, the amount of parallax can be easily adjusted.

It is preferable that the stereoscopic image capturing device according to the first aspect of the invention further includes display image generation unit for generating display images of image size smaller than the viewpoint images on the basis of the N viewpoint images, wherein the recording unit records the display images in the three-dimensional image file.

Accordingly, in the image reproduction device which reads the three-dimensional image file, when the virtual viewpoint images are recorded, display can be performed using the virtual viewpoint images without performing parallax adjustment. When the display images are recorded, the display images can be displayed directly without adjusting the size for display.

It is preferable that the stereoscopic image capturing device according to the first aspect of the invention further includes virtual viewpoint image generation unit for generating one or a plurality of virtual viewpoint images corresponding to an arbitrary virtual viewpoint on the basis of at least one viewpoint image of the plurality of viewpoint images acquired by the image capturing unit and the amount of parallax calculated by the parallax amount calculation unit.

Accordingly, the image capturing unit acquires only two viewpoint images to acquire many viewpoint images, thereby simplifying and lightening the image capturing unit.

It is preferable that the stereoscopic image capturing device according to the first aspect of the invention includes representative image setting unit for setting one of N images of the plurality of viewpoint images and the virtual viewpoint images as a representative image, wherein the maximum parallax amount acquisition unit acquires (N−1) maximum amount of parallax on the distant view side in association with two images of different combinations of the representative image and (N−1) images other than the representative image from the N images, the maximum display size acquisition unit acquire (N−1) maximum display sizes on the basis of the acquired (N−1) maximum amount of parallax on the distant view side, and the recording unit records the acquire (N−1) maximum amount of parallax and maximum display sizes on the distant view side in the three-dimensional image file as the auxiliary information.

Accordingly, the (N−1) maximum display sizes can be referenced in the image reproduction device, and by comparison with the display size for display, images appropriate for stereoscopic vision can be simply selected. When adjusting the amount of parallax, if the maximum amount of parallax of each image is read, the amount of parallax can be easily adjusted.

It is preferable that the stereoscopic image capturing device according to the first aspect of the invention further include display image generation unit for generating display images of image size smaller than the viewpoint images and the virtual viewpoint images on the basis of the plurality of viewpoint images and the virtual viewpoint images, wherein the recording unit records the plurality of viewpoint images and at least one of the virtual viewpoint images and the display images in the three-dimensional image file.

Accordingly, in the image reproduction device which reads the three-dimensional image file, when the virtual viewpoint images are recorded, display can be performed using the virtual viewpoint images without performing parallax adjustment. When the display images are recorded, the display images can be displayed directly without adjusting the size for display.

In the stereoscopic image capturing device according to the first aspect of the invention, it is preferable that the three-dimensional image file be a multi-picture file in which one to a plurality of images are stored subsequent to a head image, and the recording unit record the representative image set by the representative image setting unit as the head image, and record auxiliary information corresponding to each image immediately before the image.

Accordingly, a plurality of images and auxiliary information can be appropriately recorded.

In the stereoscopic image capturing device according to the first aspect of the invention, it is preferable that the representative image setting unit set one representative image from the plurality of viewpoint images, and the recording unit records the display images next to the representative image, and records other viewpoint image or virtual viewpoint images next to the display images.

Accordingly, display images can be read quickly in the image reproduction device, and the required time until images are displayed on the stereoscopic display can be reduced.

In the stereoscopic image capturing device according to the first aspect of the invention, it is preferable that the recording unit record the display images in an arrangement order of viewpoints or in order from the centermost viewpoint.

Accordingly, display images can be appropriately recorded.

In the stereoscopic image capturing device according to the first aspect of the invention, it is preferable that the recording unit record viewpoint information representing whether each image is an image of an actual viewpoint or an image of a virtual viewpoint as the auxiliary information of the three-dimensional image file when recording the plurality of viewpoint images and the virtual viewpoint images in the three-dimensional image file.

Accordingly, in the image reproduction device which reads the three-dimensional image file, an image of an actual viewpoint and an image of a virtual viewpoint can be distinguished.

In the stereoscopic image capturing device according to the first aspect of the invention, the maximum display size acquisition unit acquires the maximum display size from the display sizes of which the amount of image deviation on the stereoscopic display corresponding to the maximum amount of parallax on the distant view side acquired by the maximum parallax amount acquisition unit is equal to or smaller than the interocular distance of the person as the maximum display size enabling binocular fusion.

Accordingly, the maximum display size can be appropriately acquired.

In the stereoscopic image capturing device according to the first aspect of the invention, the maximum display size acquisition unit reads the corresponding maximum display size from storage unit, which stores the maximum display size corresponding to the maximum amount of parallax in advance, on the basis of the maximum amount of parallax on the distant view side acquired by the maximum parallax amount acquisition unit or calculates the maximum display size using a computational expression including a predetermined value representing the interocular distance of the person.

Accordingly, the maximum display size can be appropriately acquired.

In order to attain the above-described object, a stereoscopic image capturing device according to a second aspect of the invention includes image capturing unit for acquiring a plurality of viewpoint images of the same subject from a plurality of viewpoints, display image generation unit for generating a plurality of large-screen display images of image size smaller than the viewpoint images on the basis of the plurality of acquired viewpoint images, parallax amount calculation unit for calculating the amount of parallax representing the amount of deviation between feature points having common features from the plurality of acquired viewpoint images, maximum parallax amount acquisition unit for acquiring the maximum amount of parallax on a distant view side from the calculated amount of parallax of each feature point, image deviation amount calculation unit for, when a stereoscopic image based on the plurality of viewpoint images is displayed on a predetermined large-screen stereoscopic display on the basis of the acquired maximum amount of parallax on the distant view side, calculating the amount of image deviation on the stereoscopic display corresponding to the maximum amount of parallax, parallax displacement unit for, when the calculated amount of image deviation exceeds a predetermined value representing an interocular distance of a person, performing parallax displacement between the plurality of large-screen display images such that the amount of image deviation becomes the predetermined value, and recording unit for generating a three-dimensional image file having recorded therein the plurality of viewpoint images and the large-screen display images, and recording the three-dimensional image file in a recording medium, the recording unit recording the plurality of viewpoint images and the large-screen display images before parallax displacement in the three-dimensional image file when the calculated amount of image deviation is equal to or smaller than the predetermined value representing the interocular distance of the person, and recording the plurality of viewpoint images and the large-screen display images after parallax displacement in the three-dimensional image file when the calculated amount of image deviation exceeds the predetermined value representing the interocular distance of the person.

According to the second aspect of the invention having the above-described configuration, a plurality of large-screen display images of image size smaller than the viewpoint images are generated on the basis of the plurality of acquired viewpoint images, the maximum amount of parallax on the near view side and the maximum amount of parallax on the distant view side are acquired from the plurality of acquired viewpoint images, when a stereoscopic image based on a plurality of viewpoint images is displayed on the predetermined large-screen stereoscopic display, the amount of image deviation on the stereoscopic display corresponding to the maximum amount of parallax is calculated on the basis of at least the maximum amount of parallax on the distant view side, when the calculated amount of image deviation exceeds the predetermined value representing the interocular distance of the person, parallax displacement between a plurality of large-screen display images is performed such that the amount of deviation becomes the predetermined value, and recording is performed. For this reason, the image reproduction device having the supposed large-screen stereoscopic display can display images with an appropriate amount of parallax.

In the stereoscopic image capturing device according to the second aspect of the invention, it is preferable that the image deviation amount calculation unit has storage unit for storing a supposed display width of a stereoscopic display supposed in advance or reading unit for reading the display size of the stereoscopic display from the stereoscopic display as an output destination, and the amount of image deviation on the supposed stereoscopic display or the stereoscopic display as the output destination is calculated on the basis of the acquired maximum amount of parallax on the distant view side, the supposed display width stored in the storage unit, or the display size read by the reading unit.

Accordingly, the width of the stereoscopic display as the output destination can be appropriately acquired.

In order to attain the above-described object, a method of controlling a stereoscopic image capturing device according to a third aspect of the invention includes an image capturing step of acquiring a plurality of viewpoint images of the same subject from a plurality of viewpoints, a parallax amount calculation step of calculating the amount of parallax representing the amount of deviation between feature points having common features from the plurality of acquired viewpoint images, a maximum parallax amount acquisition step of acquiring the maximum amount of parallax on a distant view side from the calculated amount of parallax of each feature point, a maximum display size acquisition step of acquiring the maximum display size enabling binocular fusion when a stereoscopic image based on the plurality of viewpoint images is displayed on a stereoscopic display on the basis of the acquired maximum amount of parallax on the distant view side, and a recording step of generating a three-dimensional image file in which the plurality of viewpoint images are recorded, and recording the three-dimensional image file in a recording medium, the recording step recording the plurality of viewpoint images in the three-dimensional image file and recording the maximum amount of parallax on the distant view side and the maximum display size in the three-dimensional image file as auxiliary information.

In order to attain the above-described object, a method of controlling a stereoscopic image capturing device according to a fourth aspect of the invention includes an image capturing step of acquiring a plurality of viewpoint images of the same subject from a plurality of viewpoints, a display image generation step of generating a plurality of large-screen display images of image size smaller than the viewpoint images on the basis of the plurality of acquired viewpoint images, a parallax amount calculation step of calculating the amount of parallax representing the amount of deviation between feature points having common features from the plurality of acquired viewpoint images, a maximum parallax amount acquisition step of acquiring the maximum amount of parallax on a distant view side from the calculated amount of parallax of each feature point, an image deviation amount calculation step of, when a stereoscopic image based on the plurality of viewpoint images is displayed on a predetermined large-screen stereoscopic display on the basis of the acquired maximum amount of parallax on the distant view side, calculating the amount of image deviation on the stereoscopic display corresponding to the maximum amount of parallax, a parallax displacement step of, when the calculated amount of image deviation exceeds a predetermined value representing an interocular distance of a person, performing parallax displacement between the plurality of large-screen display images such that the amount of image deviation becomes the predetermined value, and a recording step of generating a three-dimensional image file having recorded therein the plurality of viewpoint images and the large-screen display images, and recording the three-dimensional image file in a recording medium, the recording step recording the plurality of viewpoint images and the large-screen display images before parallax displacement in the three-dimensional image file when the calculated amount of image deviation is equal to or smaller than the predetermined value representing the interocular distance of the person, and recording the plurality of viewpoint images and the large-screen display images after parallax displacement in the three-dimensional image file when the calculated amount of image deviation exceeds the predetermined value representing the interocular distance of the person.

According to the invention, when a stereoscopic image is reproduced in the image reproduction device, the processing for adjusting the amount of parallax depending on the screen size can be reduced as much as possible, and the viewer can recognize the stereoscopic image as a natural stereoscopic image regardless of the screen size.

BRIEF DESCRIPTION OF THE DRAWINGS

FIG. 5 is a diagram showing a condition in which four viewpoint images are photographed.

FIG. 8 is a diagram illustrating a virtual viewpoint.

FIG. 13 is a diagram schematically showing the data structure of a 3D image file.

DESCRIPTION OF THE PREFERRED EMBODIMENTS

Hereinafter, preferred embodiments of the invention will be described with reference to the accompanying drawings.

First Embodiment

A 3D image file according to a first embodiment will be described.

Figure 1:
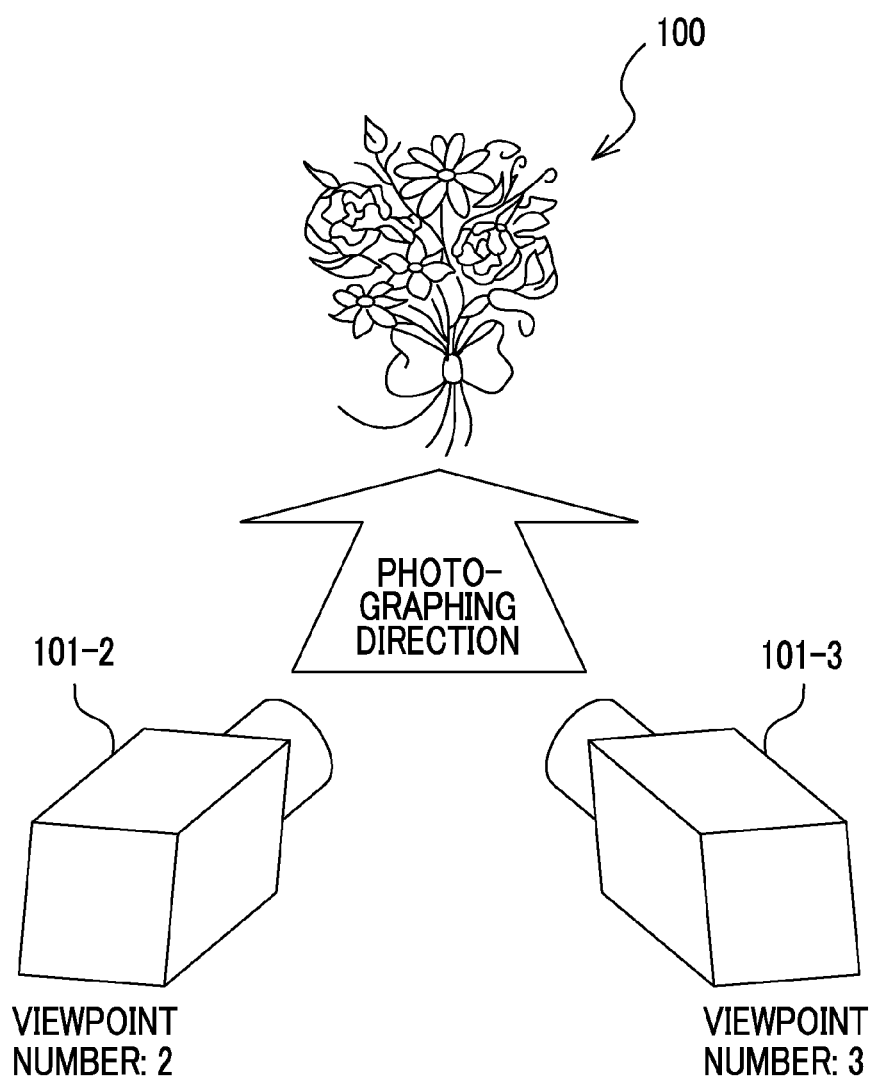
FIG. 1 is a diagram showing a condition in which two viewpoint images are photographed.
Figure 2:
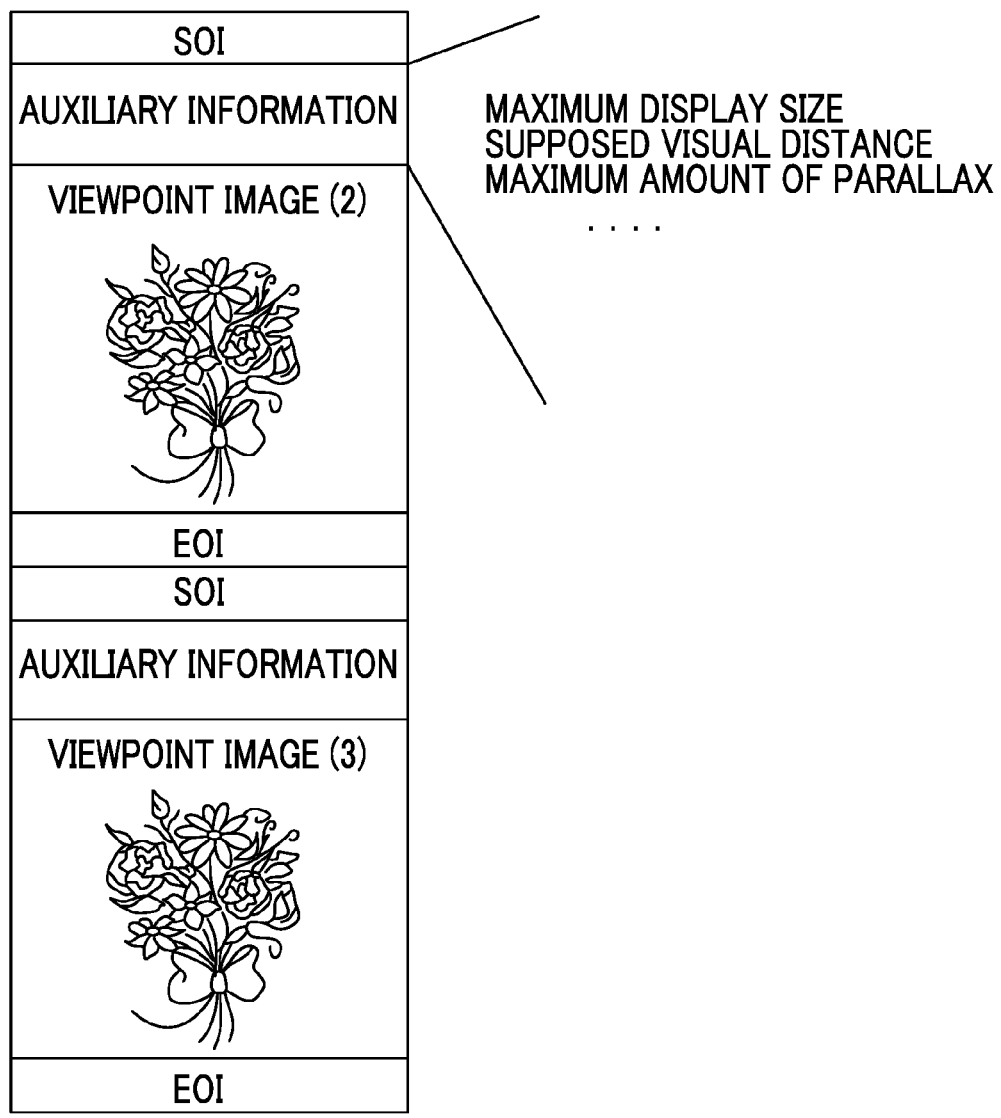
FIG. 2 is a diagram schematically showing the data structure of a 3D image file.

FIG. 1 is a diagram showing a condition in which two viewpoint images are photographed from different viewpoints with respect to a subject 100 using image capturing means of two image capturing devices 101-2 and 101-3 (image capturing step). FIG. 2 is a diagram schematically showing the data structure of a 3D image file in which two viewpoint images 201-2 and 201-3 photographed by the image capturing unit of the image capturing devices 101-2 and 101-3 shown in FIG. 1 are recorded.

The 3D image file shown in FIG. 2 is an MP file based on an MP format, and a plurality of viewpoint images of the same subjects are connected and collected in one file. In each of the connected viewpoint images, an SOI (Start of Image) marker is recorded at the top of data, and an EOI (End of Image) marker is recorded at the end of data. Accordingly, the read start position and end position of each image can be recognized.

Each piece of viewpoint image data has an image region and an auxiliary information region. In the auxiliary information region, in addition to Exif auxiliary information having photographing device information, information regarding a photographing mode, and the like, in this embodiment, auxiliary information including a maximum display size (width and height, unit: mm) acquired during image recording, a visual distance (the distance between a viewer who observes a stereoscopic image and a display) (unit: mm) supposed during image recording, a maximum amount of parallax (near view) (%), a maximum amount of parallax (distant view) (%), a convergence angle of a device photographing each viewpoint image, a base line length, an image capturing unit arrangement (viewpoint number), and the number of times of photographing when each viewpoint image is acquired is recorded.

Figure 3:
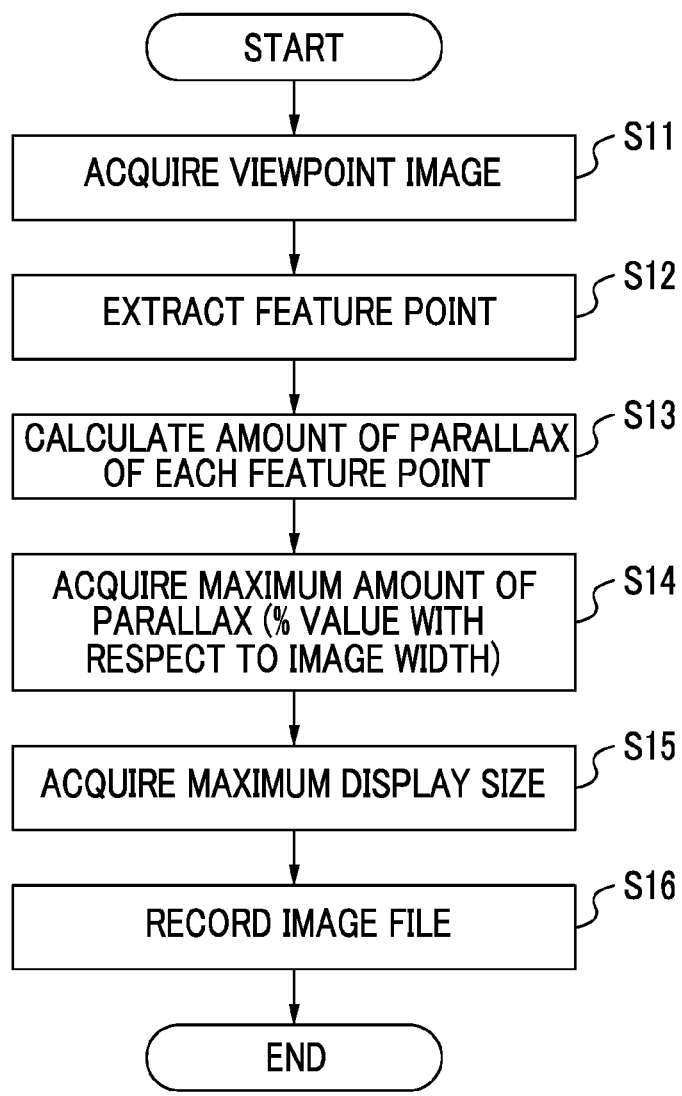
FIG. 3 is a flowchart showing photographing and recording processing.

Photographing and recording processing for recording such a 3D image file will be described with reference to the flowchart of FIG. 3.

First, a plurality of viewpoint images are acquired (Step S11). Here, as shown in FIG. 1, photographing is performed using the two image capturing devices 101-2 and 101-3 one by one with respect to the subject 100 to acquire the two viewpoint images 201-2 and 201-3. Note that the image capturing device 101-2 has a viewpoint number 2, and the image capturing device 101-3 has a viewpoint number 3.

Next, a plurality of feature points are extracted from the two viewpoint images 201-2 and 201-3 using parallax amount calculation unit (Step S12), and the amount of parallax of each feature point is calculated (Step S13, a parallax amount calculation step). Here, the amount of parallax indicates the difference in the distance from one end, for example, the left end, of each viewpoint image of the corresponding feature points between the viewpoint images, and the unit is pixel. The maximum amount of parallax on the distant view side and the maximum amount of parallax on the near view side are acquired from the calculated amount of parallax of each feature point using maximum parallax amount acquisition unit (Step S14, a maximum parallax amount acquisition step).

Figure 4A:
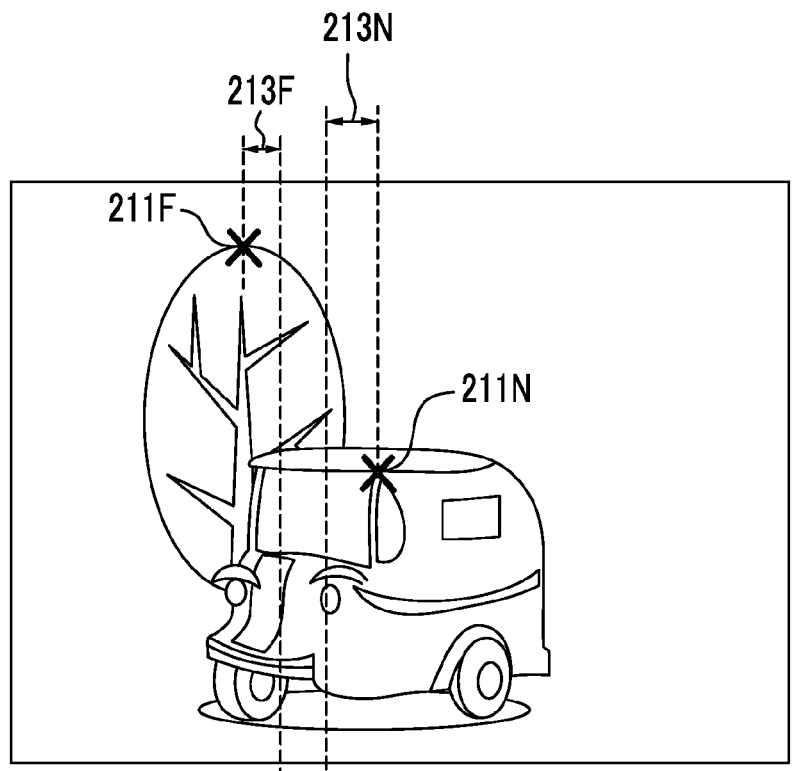
FIGS. 4A and 4B are diagrams showing an example of two viewpoint images.
Figure 4B:
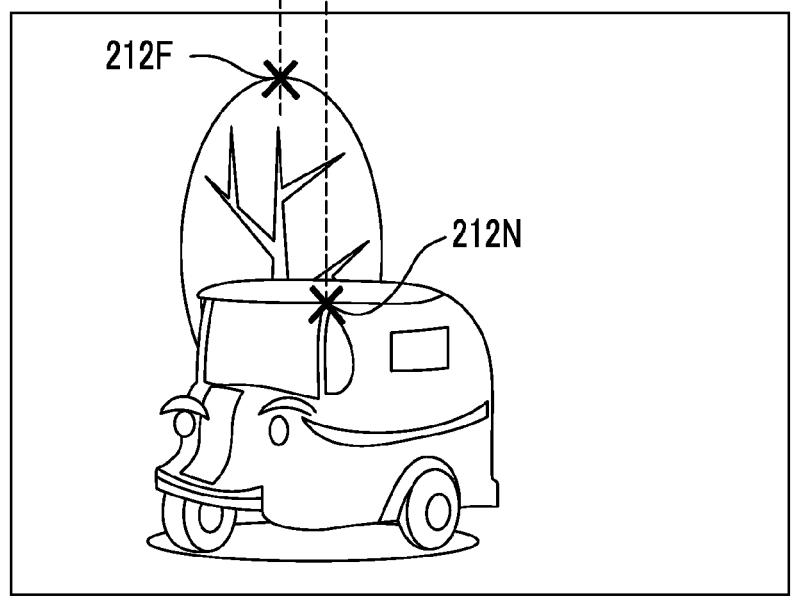

FIGS. 4A and 4B are diagrams showing an example of two viewpoint images. FIG. 4A shows a left viewpoint image 201-2, and FIG. 4B shows a right viewpoint image 201-3.

In the example of FIGS. 4A and 4B, the maximum amount of parallax on the near view side is 213N, and the feature point (the position of the maximum amount of parallax (near view)) having this amount of parallax is 211N and 212N. The maximum amount of parallax on the distant view side is 213F, and the feature point (the position of the maximum amount of parallax (distant view)) having this amount of parallax is 211F and 212F. That is, when stereoscopic vision of a stereoscopic image based on the two viewpoint images 201-2 and 201-3 is achieved, the position of the maximum amount of parallax (near view) is viewed most closely, and the position of the maximum amount of parallax (distant view) is viewed most distantly.

The ratios (%) of the maximum amount of parallax 213N on the near view side and the maximum amount of parallax 213F on the distant view side with respect to the image width become a maximum amount of parallax (near view) (%) and a maximum amount of parallax (distant view) (%).

The maximum display size is acquired on the basis of the calculated maximum amount of parallax using the maximum display size acquisition unit (Step S15, a maximum display size acquisition step). If the amount of parallax on the distant view side exceeds the interocular distance of a person, binocular fusion is disabled at the position of the image, and stereoscopic vision cannot be achieved. Accordingly, the maximum display size of which parallax does not exceed the interocular distance of the person is acquired from the ratio (%) of the maximum amount of parallax (distant view) with respect to the image width calculated in Step S14.

For example, if it is assumed that the interocular distance of the person is 50 mm, and the ratio of the maximum amount of parallax (distant view) with respect to the image width is 10%, the maximum display width which is allowed for stereoscopic vision becomes 500 mm. That is, in the case of a display having a width equal to or smaller than 500 mm, display is performed such that the amount of parallax of the maximum parallax position (distant view) does not exceed the interocular distance 50 mm, and as a result, the viewer can view stereoscopic vision. When a display having an aspect ratio of 16:9 is assumed, the maximum display height becomes 281.25 mm.

The interocular distance of the person may be determined appropriately for the intended viewer. For example, when only an adult is intended, the value of a wide width of 65 mm or the like may be set.

For example, if it is assumed that the interocular distance of the person is 65 mm, and the ratio of the maximum amount of parallax (distant view) with respect to the image width is 15%, the maximum display width which is allowed for stereoscopic vision becomes about 433 mm. When a display having an aspect ratio of 16:9 is assumed, the maximum display height becomes about 244 mm.

Instead of calculation using the interocular distance of the person, a table in which the maximum display size corresponding to the maximum amount of parallax is recorded may be prepared in advance, and the maximum display size may be acquired with reference to the table.

Finally, as shown in FIG. 2, the two viewpoint images 201-2 and 201-3 and the auxiliary information are recorded as one 3D image file using recording unit (Step S16, a recording step).

That is, subsequent to the SOI marker for the viewpoint image 201-2, the maximum display size acquired in Step S15, the supposed visual distance, the maximum amount of parallax (near view) (%) and the maximum amount of parallax (distant view) (%) acquired in Step S14, the convergence angle of the image capturing devices 101-2 and 101-3 in Step S11, the base line length, the viewpoint number, and the number of times of photographing are recorded to be included in the auxiliary information. Thereafter, image information of the viewpoint image 201-2 and the EOI marker are recorded.

The SOI marker, the auxiliary information, the image information, and the EOI marker of the viewpoint image 201-3 are recorded. In the auxiliary information region of the viewpoint image 201-3, only Exif auxiliary information may be recorded.

As described above, the 3D image file shown in FIG. 2 can be recorded.

The 3D image file recorded in this way is read by a stereoscopic image reproduction device when being displayed on a 3D display. At this time, in the stereoscopic image reproduction device, the maximum display size recorded in the auxiliary information of the 3D image file is compared with the display size of the 3D display for display, thereby easily determining whether or not stereoscopic vision is possible. Accordingly, when it is determined that stereoscopic vision is possible, the recorded image may be displayed directly, and processing for adjusting the amount of parallax can be reduced depending on the screen size in the stereoscopic image reproduction device.

When it is necessary to adjust the amount of parallax in the stereoscopic image reproduction device, the amount of parallax can be appropriately adjusted using information regarding the supposed visual distance or the number of times of photographing recorded in the auxiliary information.

Although in this embodiment, the maximum display size is determined on the basis of only the maximum amount of parallax on the distant view side, the maximum display size may be determined taking into consideration the maximum amount of parallax on the near view side. Taking into consideration the maximum amount of parallax on the near view side, the maximum display size capable of appropriately achieving stereoscopic vision on the near view side as well as the distant view side can be determined.

For example, the display size of which the amount of parallax on the near view side becomes equal to or smaller than 50 mm may be set as the maximum display size. This is because, if the amount of parallax on the near view side increases, the viewer feels fatigued in stereoscopic vision, and thus it is preferable that the amount of parallax is equal to or smaller than a predetermined amount.

Alternatively, one of N (N is an integer equal to or greater than 3) viewpoint images acquired by the image capturing unit may be set as a representative image using representative image setting unit, and (N−1) maximum amount of parallax on the distant view side in association with two images of different combinations of the representative image and (N−1) viewpoint image other than the representative image from the N images can be acquired using maximum parallax amount acquisition unit. At this time, (N−1) maximum display sizes are acquired on the basis of the acquired (N−1) maximum amount of parallax on the distant view side using maximum display size acquisition unit, and the acquired (N−1) maximum amount of parallax on the distant view side and the maximum display sizes are recorded in the three-dimensional image file as the auxiliary information using recording unit. Accordingly, the (N−1) maximum display sizes can be referenced in the image reproduction device, and by comparison with the display size for display, images appropriate for stereoscopic vision can be simply selected. When adjusting the amount of parallax, if the maximum amount of parallax of each image is read, the amount of parallax can be easily adjusted.

Second Embodiment

Although in the first embodiment, an example where two viewpoint images are photographed from two viewpoints has been described, the number of viewpoints of a stereoscopic image according to the invention is not limited to two, and multi-viewpoint images may be used.

FIG. 5 is a diagram showing a condition in which four viewpoint images are photographed from different viewpoints with respect to the subject 100 using four image capturing devices 101-1 to 101-4. It is assumed that the viewpoint numbers of the image capturing devices 101-1 to 101-4 are 1 to 4 in order.

Figure 6:
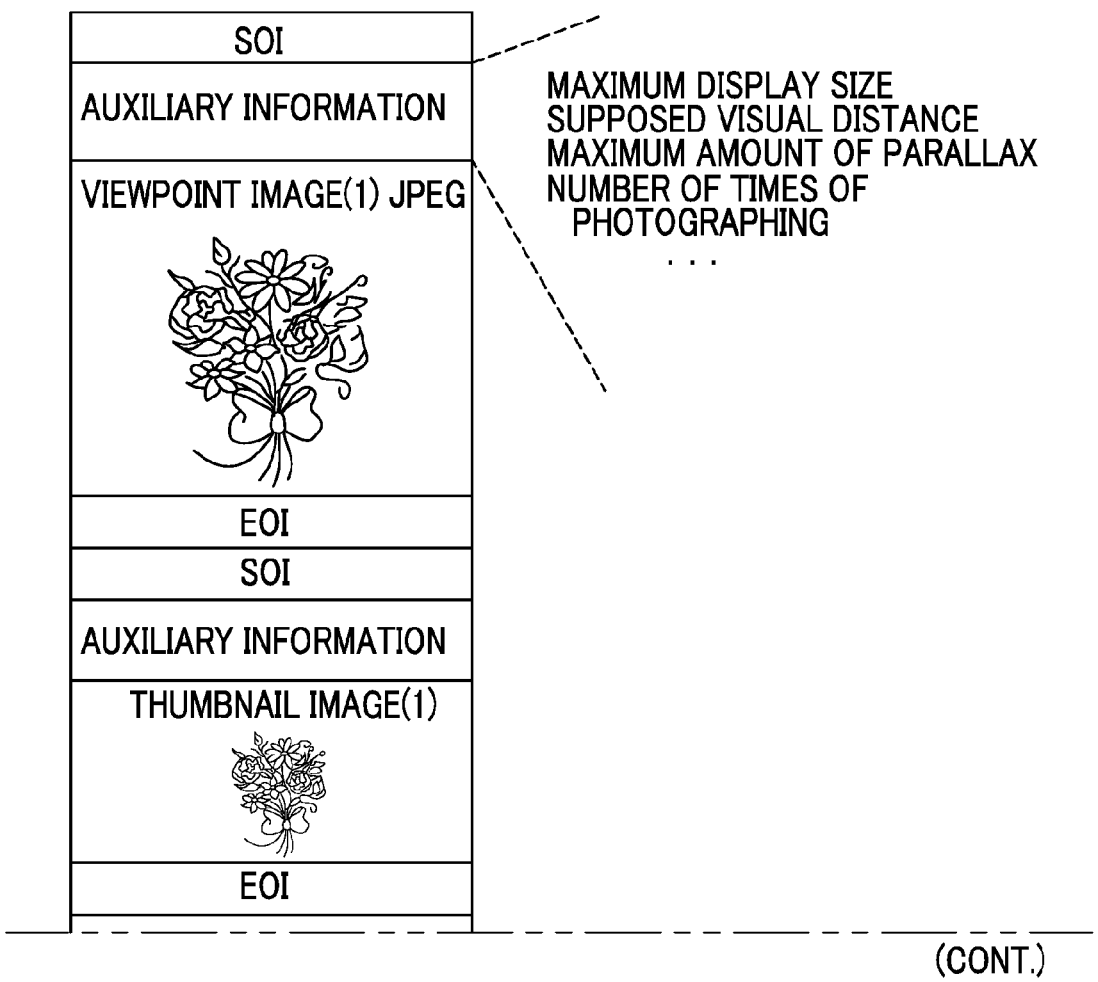
FIG. 6 is a diagram schematically showing the data structure of a 3D image file.
Figure 6:
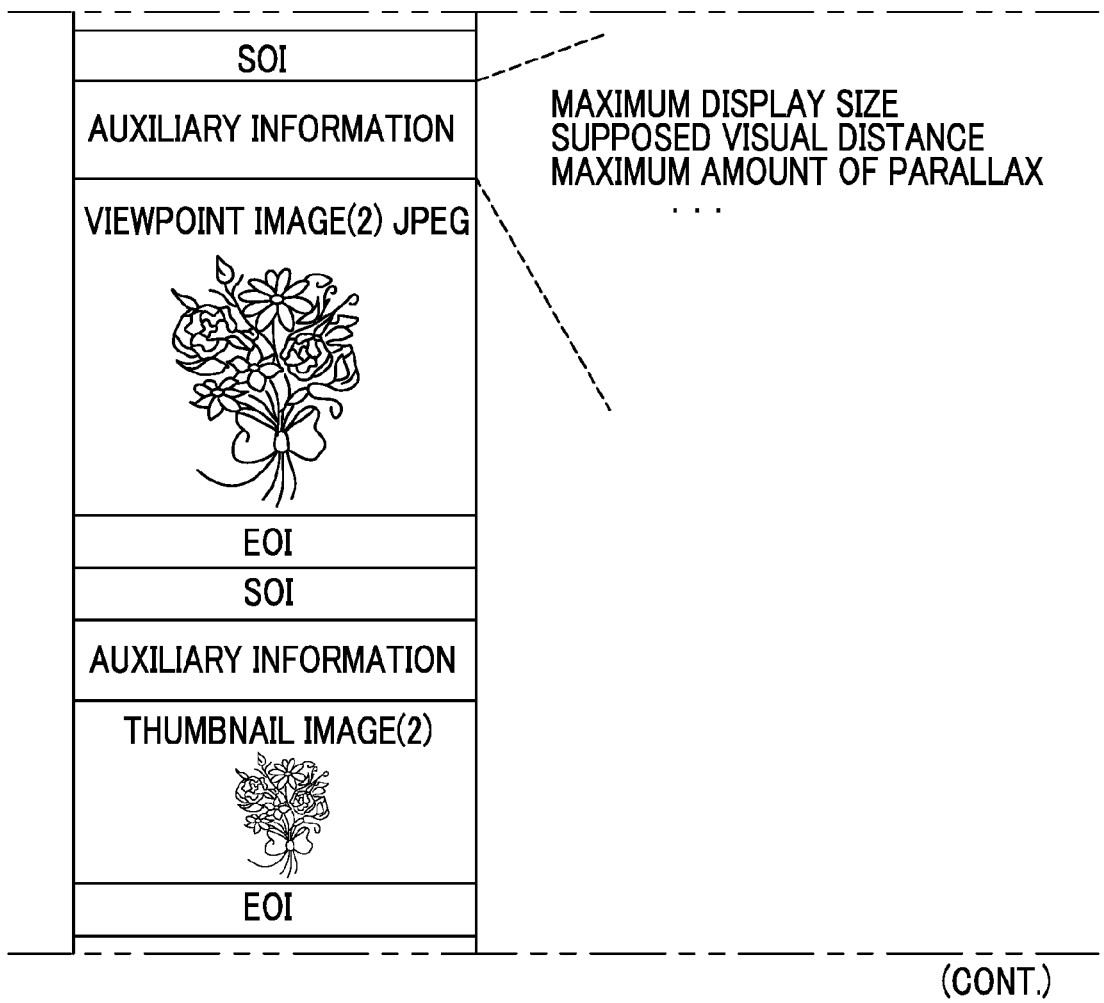
Figure 6:
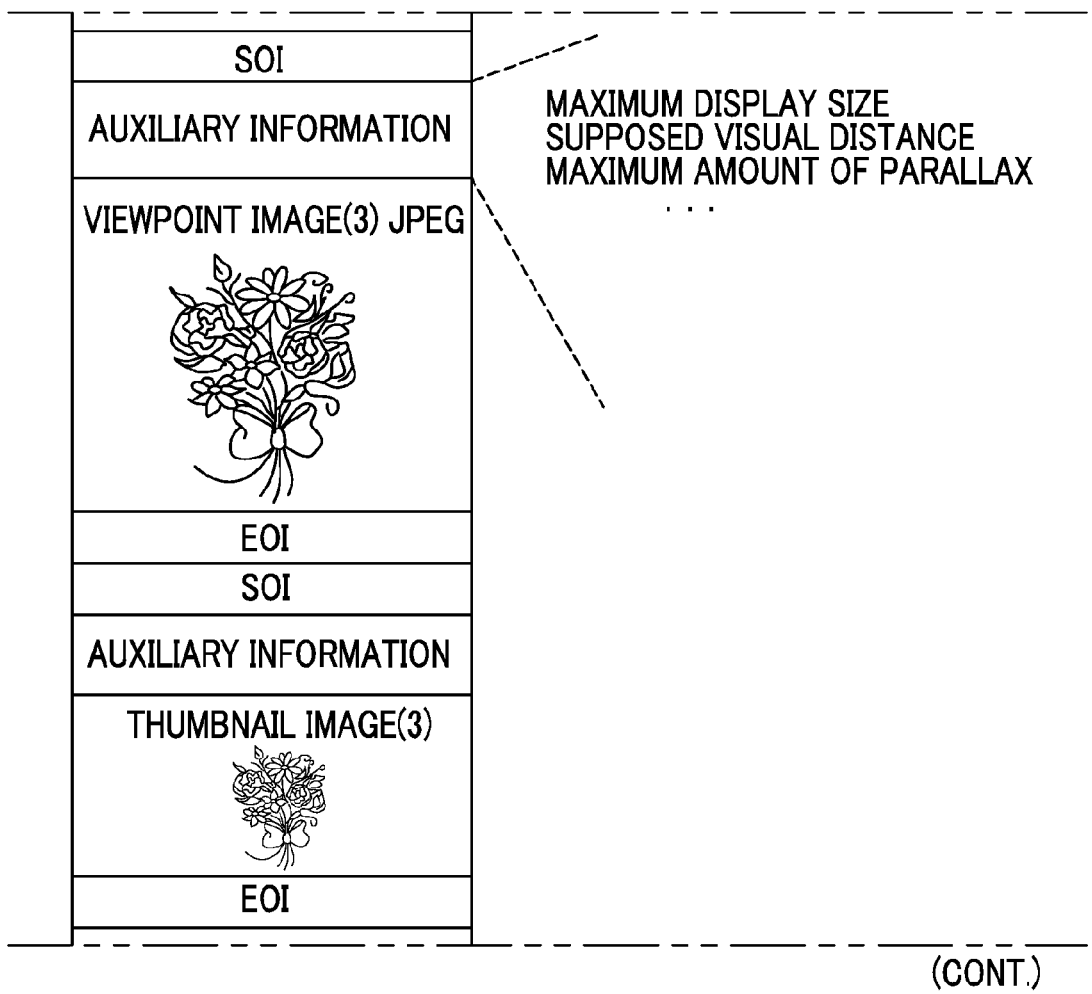
Figure 6:
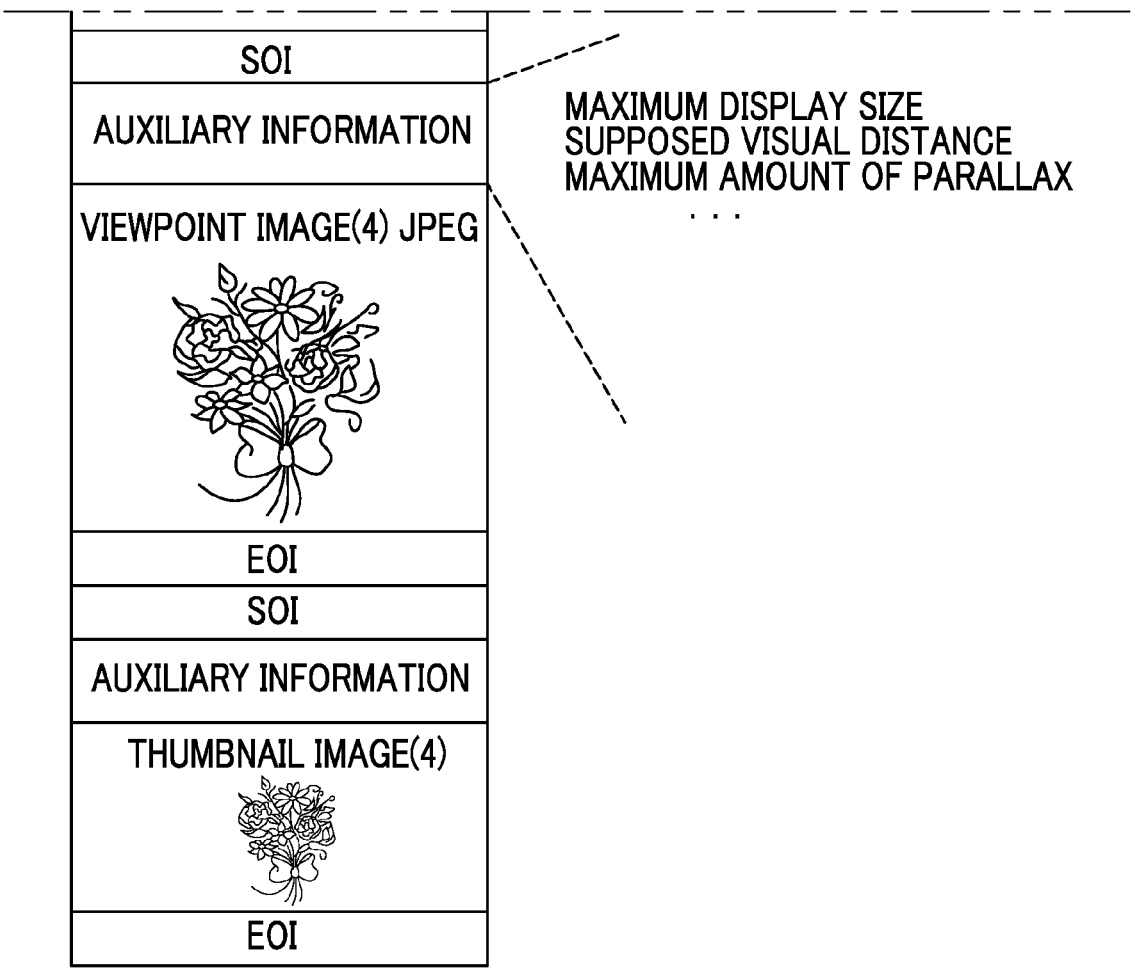

FIG. 6 is a diagram schematically showing the data structure of a 3D image file in which four viewpoint images photographed by the four image capturing devices 101-1 to 101-4 are recorded. In the 3D image file, in addition to the four viewpoint images, an image for display obtained by reducing the size of each viewpoint image generated by display image generation unit is recorded (a display image generation step). As an image for display, a full HD image having resolution of 1920×1080 is used.

As shown in FIG. 6, these images are recorded in order of a viewpoint image (hereinafter, called a viewpoint image (1)) of a viewpoint number 1, an image (hereinafter, called a thumbnail image (1)) for display of the viewpoint number 1, a viewpoint image (hereinafter, called a viewpoint image (2)) of a viewpoint number 2, an image (hereinafter, called a thumbnail image (2)) for display of the viewpoint number 2, a viewpoint image (hereinafter, called a viewpoint image (3)) of a viewpoint number 3, an image (hereinafter, called a thumbnail image (3)) for display of the viewpoint number 3, a viewpoint image (hereinafter, called a viewpoint image (4)) of a viewpoint number 4, and an image (hereinafter, called a thumbnail image (4)) for display of the viewpoint number 4.

First, the viewpoint image (1) photographed with the viewpoint number 1 as a reference viewpoint is recorded as a head image, and the recording region has an SOI marker, auxiliary information region, an image information region, and an EOI marker.

In the auxiliary information region, as in the first embodiment, in addition to Exif auxiliary information having photographing device information, information regarding a photographing mode, and the like, auxiliary information including a maximum display size, a supposed visual distance, a maximum amount of parallax (near view), a maximum amount of parallax (distant view), a convergence angle of a device photographing each viewpoint image, a base line length, an image capturing unit arrangement (viewpoint number), the number of times of photographing when each viewpoint image is acquired, and the like is recorded.

In regard to the maximum display size, the maximum amount of parallax, and the like, the values where the entire 3D image file is used are recorded. Specifically, the maximum amount of parallax calculated from a viewpoint image (in this case, the viewpoint image (4)) with the greatest amount of parallax on the basis of the viewpoint image (1) photographed with the reference viewpoint, and the maximum display size acquired from the maximum amount of parallax are recorded. In regard the convergence angle, the base line length, and the like, the convergence angle and the base line length to a device photographing the same viewpoint image (in this case, the viewpoint image (4)) are recorded.

In the image information region, image information of the viewpoint image (1) is recorded, and the EOI marker is subsequently recorded.

Subsequently to the viewpoint image (1), the thumbnail image (1) generated from the viewpoint image (1) is recorded, and as before, the recording region has an SOI marker, an auxiliary information region, an image information region, and an EOI marker. In the auxiliary information region, normal Exif auxiliary information is recorded.

Subsequently to the thumbnail image (1), the viewpoint image (2) is recorded. The recording region of the viewpoint image (2) also has an SOI marker, an auxiliary information region, an image information region, and an EOI marker.

In the auxiliary information region, in addition to normal Exif auxiliary information, auxiliary information including a maximum display size calculated from the viewpoint image (2) and the viewpoint image (1) photographed with the reference viewpoint, a supposed visual distance, a maximum amount of parallax (near view), a maximum amount of parallax (distant view), a convergence angle of a device photographing two viewpoint images, a base line length, a viewpoint number, the number of times of photographing of two viewpoint images, and the like is included and recorded.

Subsequently to the viewpoint image (2), the thumbnail image (2) generated from the viewpoint image (2) is recorded, and thereafter, the viewpoint image (3) is recorded.

The recording region of the viewpoint image (3) also has an SOI marker, an auxiliary information region, an image information region, and an EOI marker. In the auxiliary information region, in addition to normal Exif auxiliary information, the maximum display size calculated from the viewpoint image (3) and the viewpoint image (1) photographed with the reference viewpoint, and the like are recorded in the same way.

Hereinafter, in regard to the viewpoint image (4), the same is recorded.

In this way, when recording multi-viewpoint images, it is preferable that the maximum display size as auxiliary information of each viewpoint image in the relation with the head image is recorded.

The 3D image file recorded in this way is read by the stereoscopic image reproduction device when being displayed on the 3D display. At this time, in the stereoscopic image reproduction device, the maximum display size of each viewpoint image recorded in the auxiliary information of the 3D image file is compared with the display size of the 3D display for display, thereby appropriately and easily determining whether or not stereoscopic vision is possible.

The recording order of multi-viewpoint images is not limited to the order shown in FIG. 6.

Figure 7A:
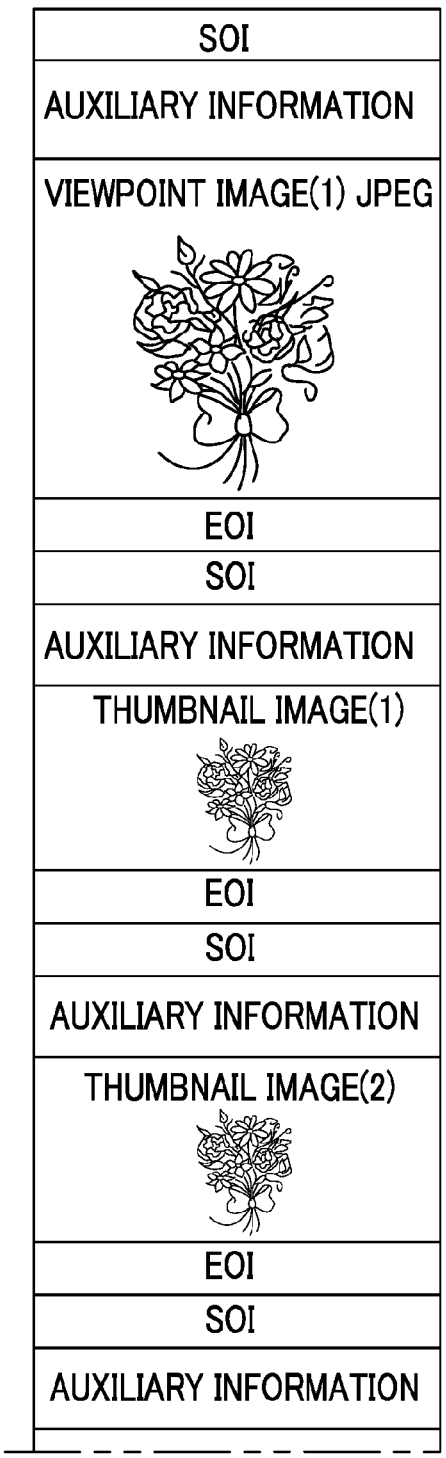
FIGS. 7A to 7C are diagrams schematically showing another form of the data structure of a 3D image file.
Figure 7A:
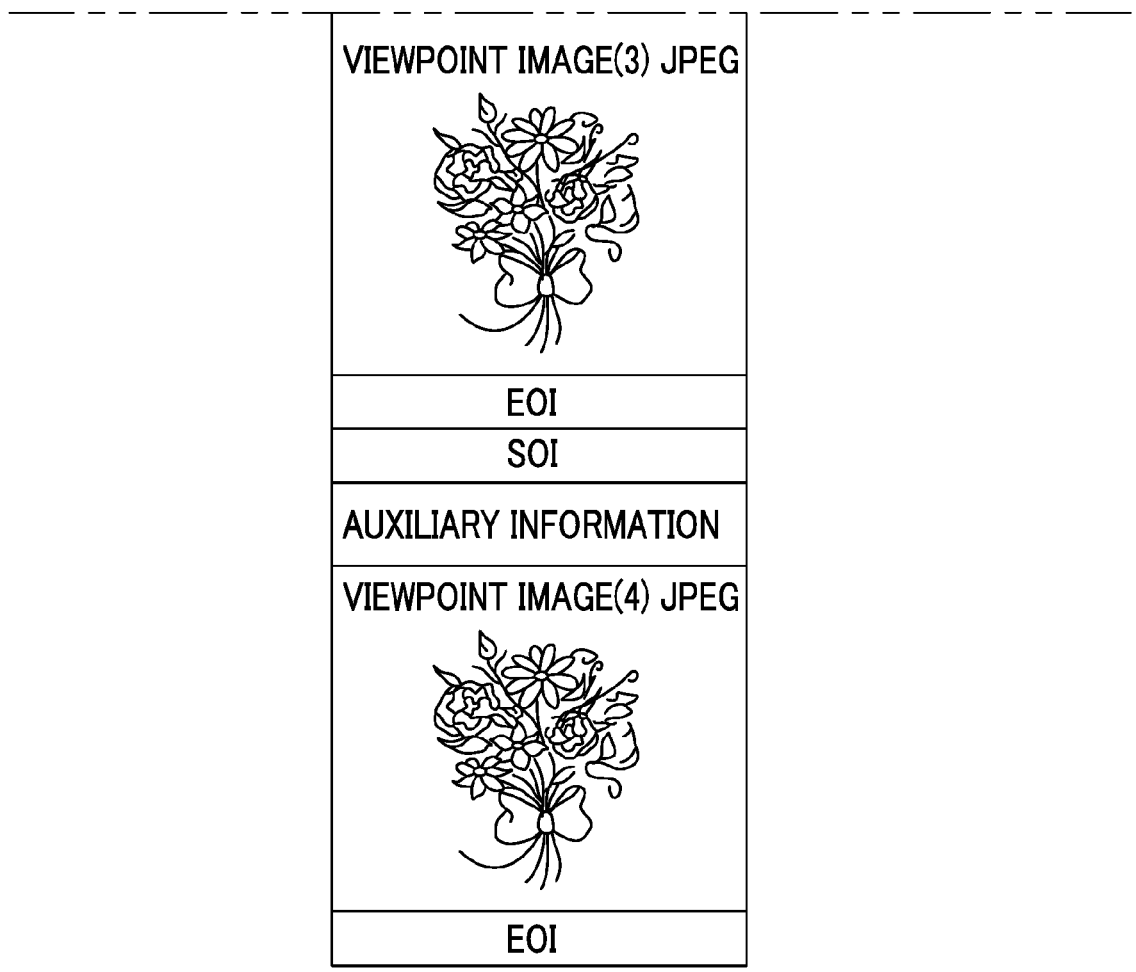

For example, as shown in FIG. 7A, the viewpoint image (1), the thumbnail image (1) to the thumbnail image (4), and the viewpoint image (2) to the viewpoint image (4) may be recorded in this order. If the thumbnail images for display are recorded earlier, image reading during file reading when display is performed can be quickened, and a required time until images are displayed on the 3D display can be reduced. Each viewpoint image is primarily used for printing, and since printing requires a predetermined time, even when viewpoint image is recorded in the second half portion of the file, there is little adverse effect.

Figure 7B:
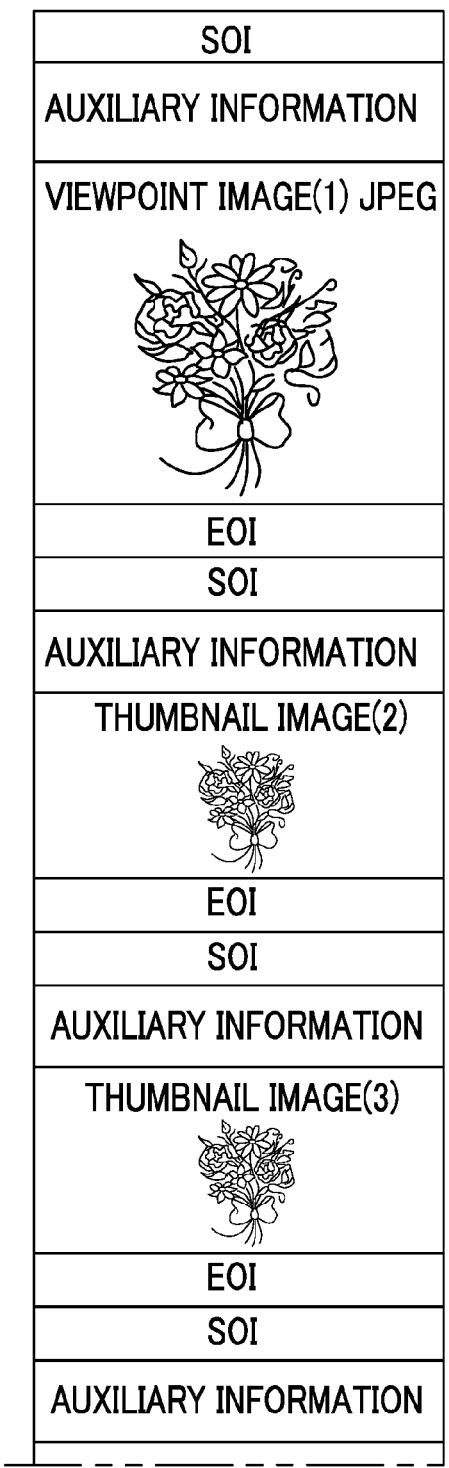
Figure 7B:
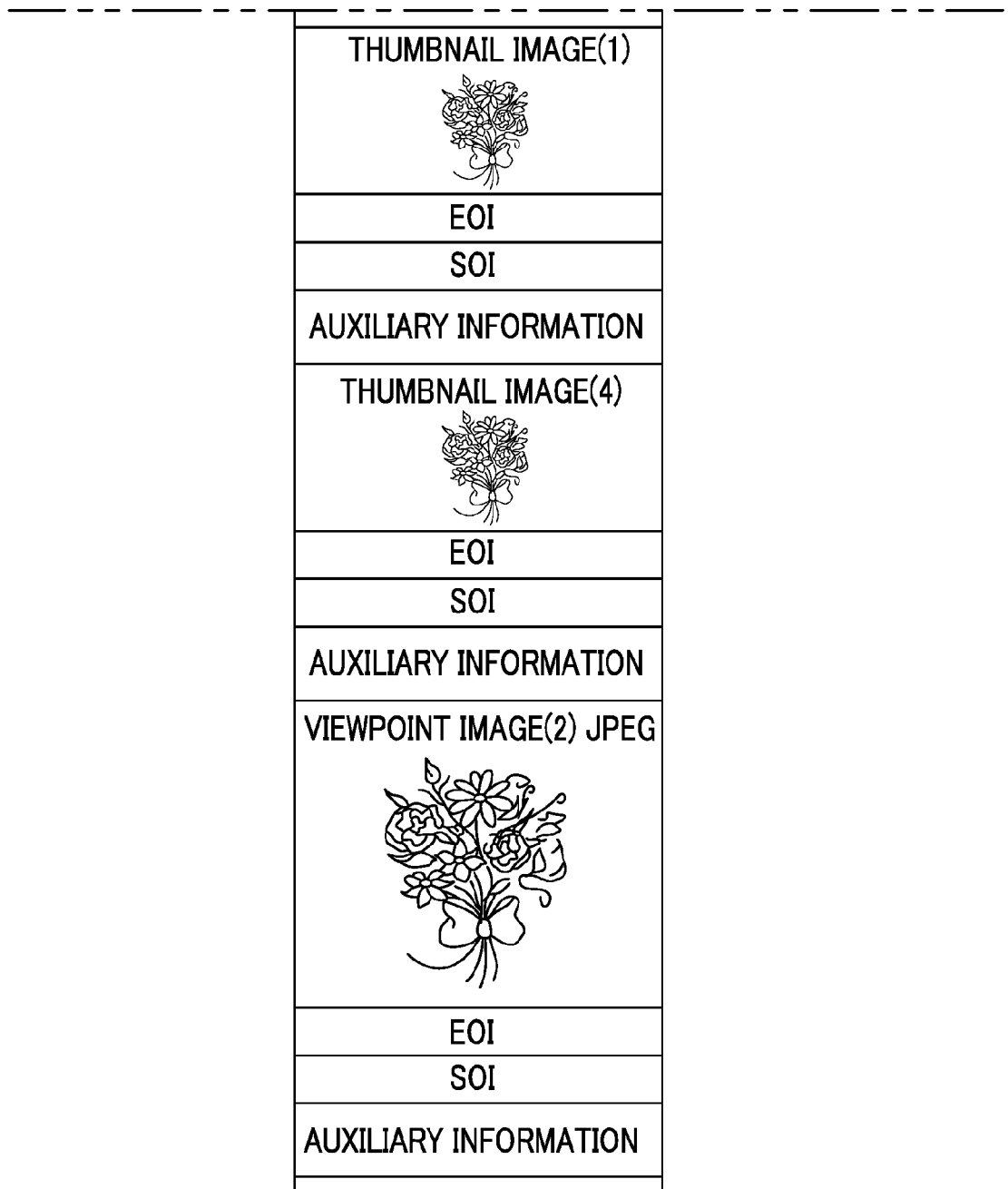
Figure 7B:
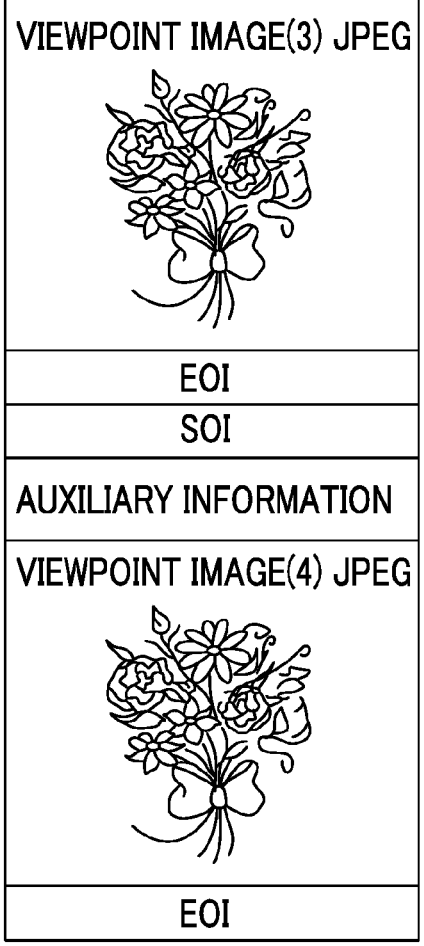

The recording order of the thumbnail images may be set such that recommended images when being displayed on the 3D display are recorded earlier. For example, if stereoscopic display using the thumbnail image (2) and the thumbnail image (3) is recommended, as shown in FIG. 7B, the thumbnail image (2) and the thumbnail image (3) may be recorded next to the viewpoint image (1) as the head image, and thereafter, the thumbnail image (1) and the thumbnail image (4) may be recorded.

When the amount of parallax of two images is small, even in a large display, display can be performed such that stereoscopic vision is possible. An image with a viewpoint close to the center is used appropriately for stereoscopic vision. Accordingly, in such a case, saying images in the viewpoint number 2 and the viewpoint number 3 are recommended, it is preferable the thumbnail image (2) and the thumbnail image (3) are recorded earlier.

Figure 7C:
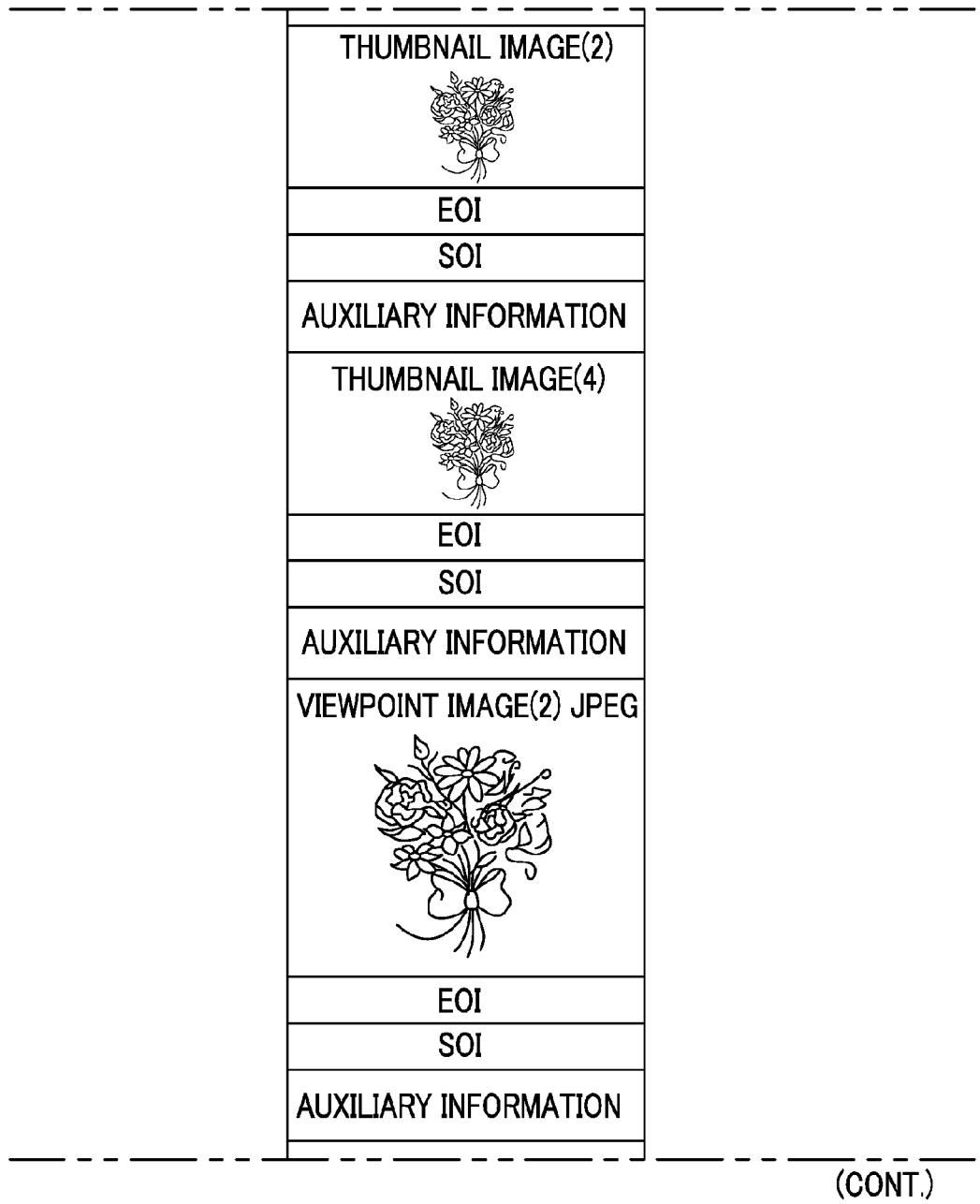
Figure 7C:
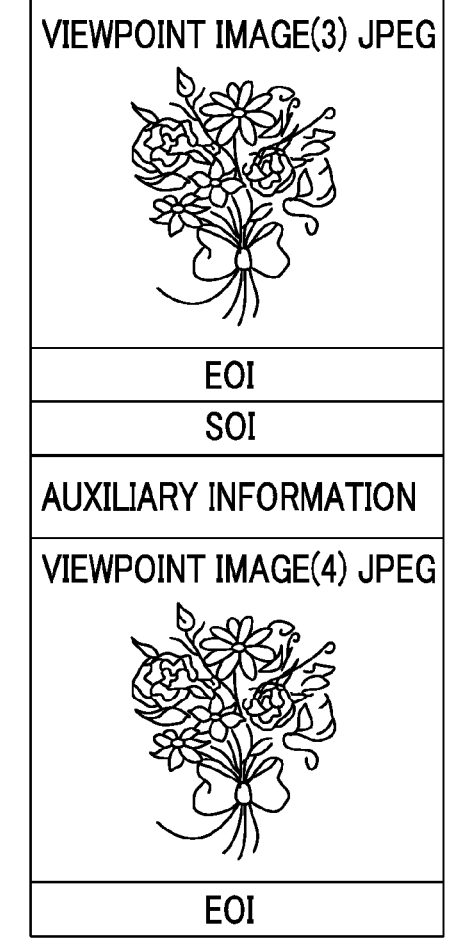

Similarly, if stereoscopic display using the thumbnail image (1) and the thumbnail image (3) is recommended, as shown in FIG. 7C, the thumbnail image (1) and the thumbnail image (3) may be recorded next to the viewpoint image (1) as the head image, and thereafter, the thumbnail image (2) and the thumbnail image (4) may be recorded.

When there are recommended images during stereoscopic display, the maximum display size, supposed visual distance, and the maximum amount of parallax in the recommended images may be recorded in the auxiliary information of the viewpoint image (1) as the head image.

Third Embodiment

All multi-viewpoint images in the second embodiment may not be images which are actually photographed, and may include virtual viewpoint images corresponding to virtual viewpoints.

For example, as shown in FIG. 8, two viewpoint images are photographed from different viewpoints (viewpoint number 1 and viewpoint number 4) with respect to the subject 100 using two image capturing devices 101-1 and 101-4. A viewpoint image 2 and a viewpoint image 3 of a viewpoint number 2 and a viewpoint number 3 with virtual viewpoints which are different from a viewpoint number 1 and a viewpoint number 4 and not actually present may be generated using virtual viewpoint image generation unit. When generating virtual viewpoint images, there is a method of internally dividing each pixel of a plurality of photographed images, a method of generating virtual viewpoint images using a parallax map generated from a plurality of photographed images and one photographed image, or the like, the method is not particularly limited.

Figure 9A:
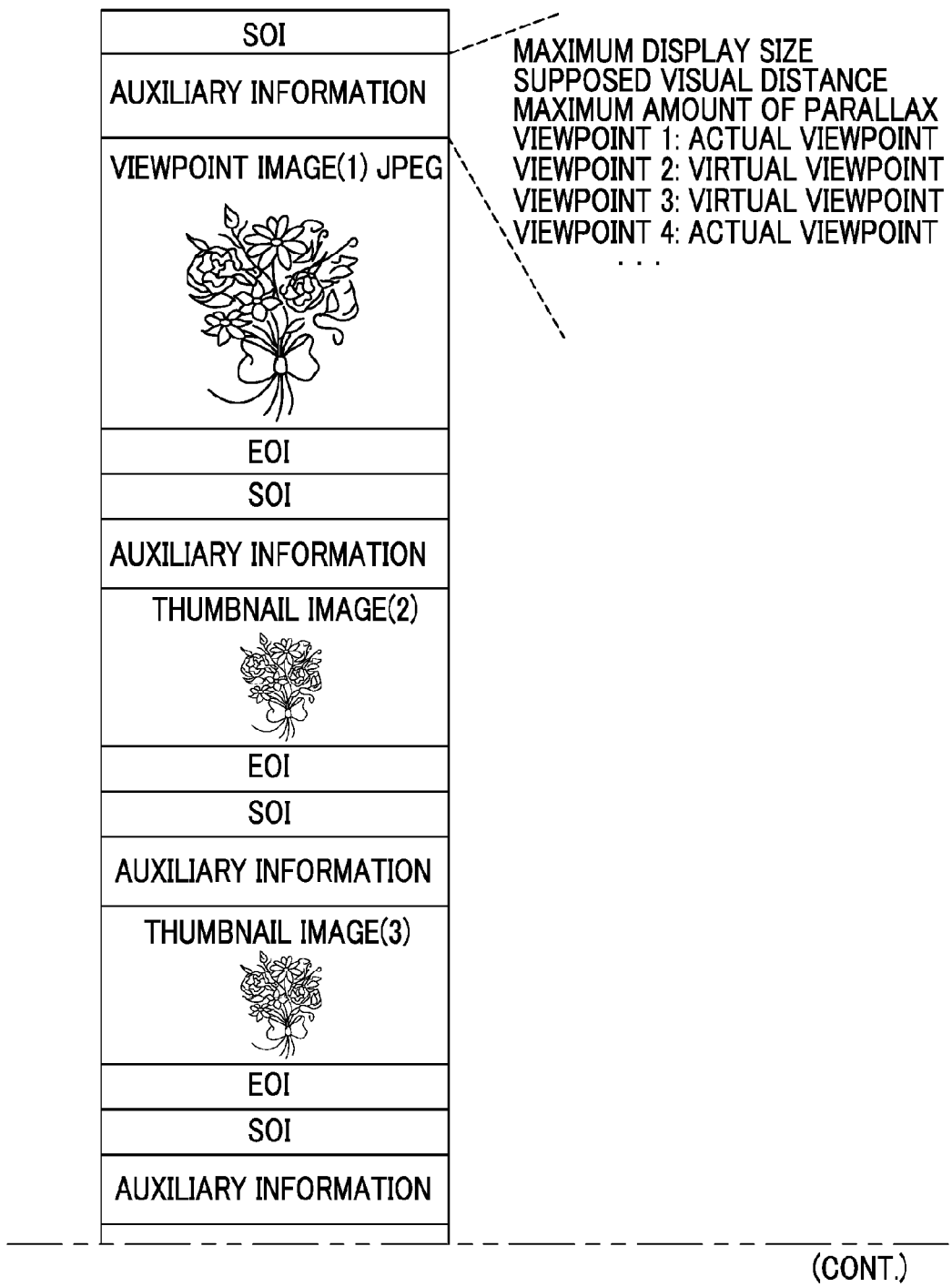
FIGS. 9A and 9B are diagrams schematically showing the data structure of a 3D image file.
Figure 9A:
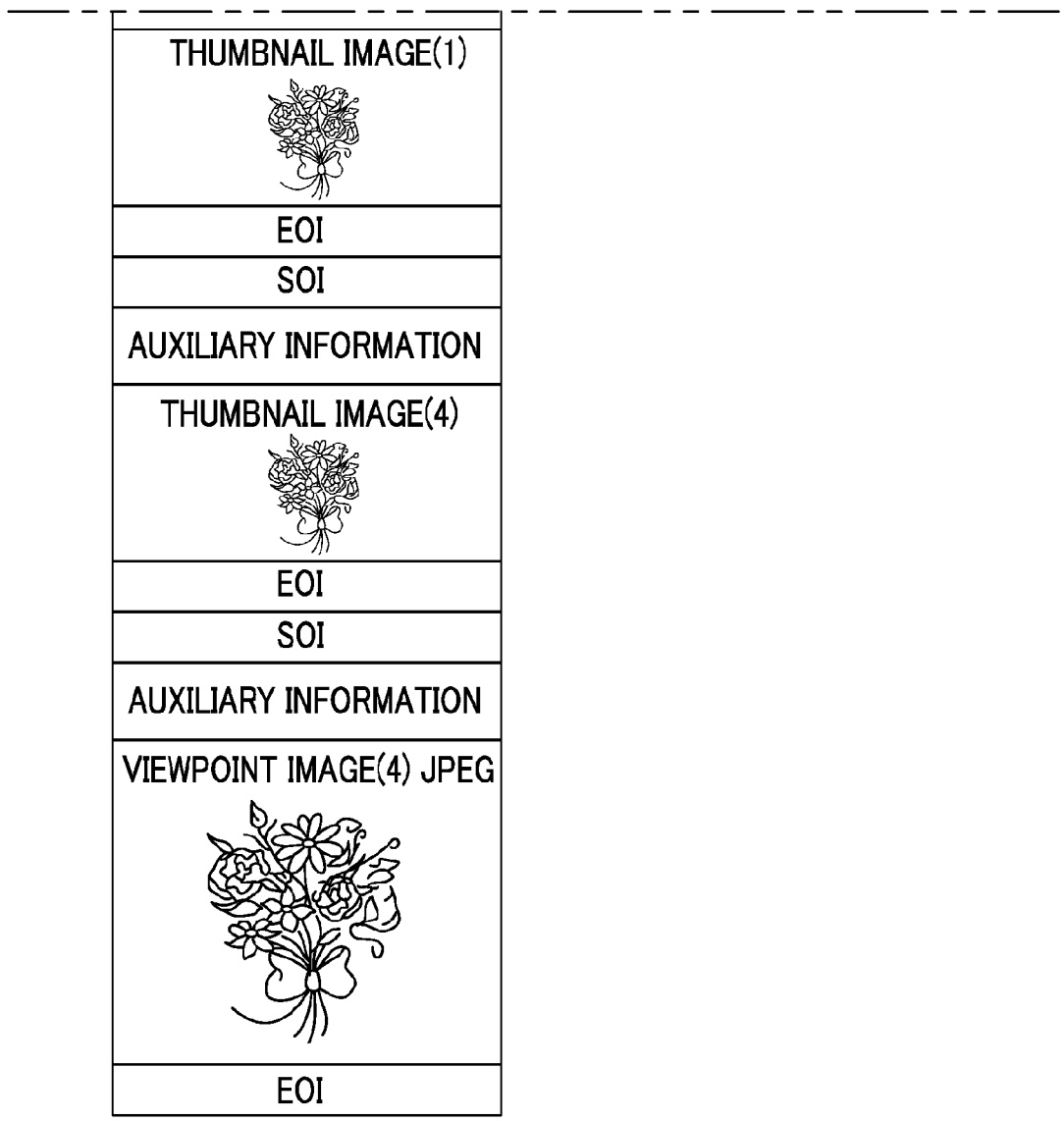

FIG. 9A is a diagram schematically showing the data structure of a 3D image file in which the viewpoint images acquired in this way are recorded. In the example of FIG. 9A, two viewpoint images (1) and (4) actually photographed, thumbnail images (1) and (4) as images for display of the viewpoint images, and thumbnail image (2) and (3) as images for display of the virtual viewpoint images are recorded.

First, the viewpoint image (1) is recorded as a head image, then, the thumbnail image (2), the thumbnail image (3), the thumbnail image (1), and the thumbnail image (4) are recorded, and subsequently, the viewpoint image (4) is recorded. Here, the thumbnail images may be recorded in a recommendation order, may be recorded in an arrangement order of viewpoints from an arbitrary direction of the left and right directions, or may be recorded in order from the centermost viewpoint. The thumbnail image (2) and the thumbnail image (3) may be generated from the thumbnail image (1) and the thumbnail image (4), or may be generated from the viewpoint image (1) and the viewpoint image (4).

As before, the recording region of each image has an SOI marker, an auxiliary information region, an image information region, and an EOI marker. In the auxiliary information region of the viewpoint image (1), in addition to a maximum display size, a supposed visual distance, and a maximum amount of parallax, viewpoint information representing whether each viewpoint number is a viewpoint (actual viewpoint) with which photographing is actually performed or a virtual viewpoint is recorded.

Figure 9B:
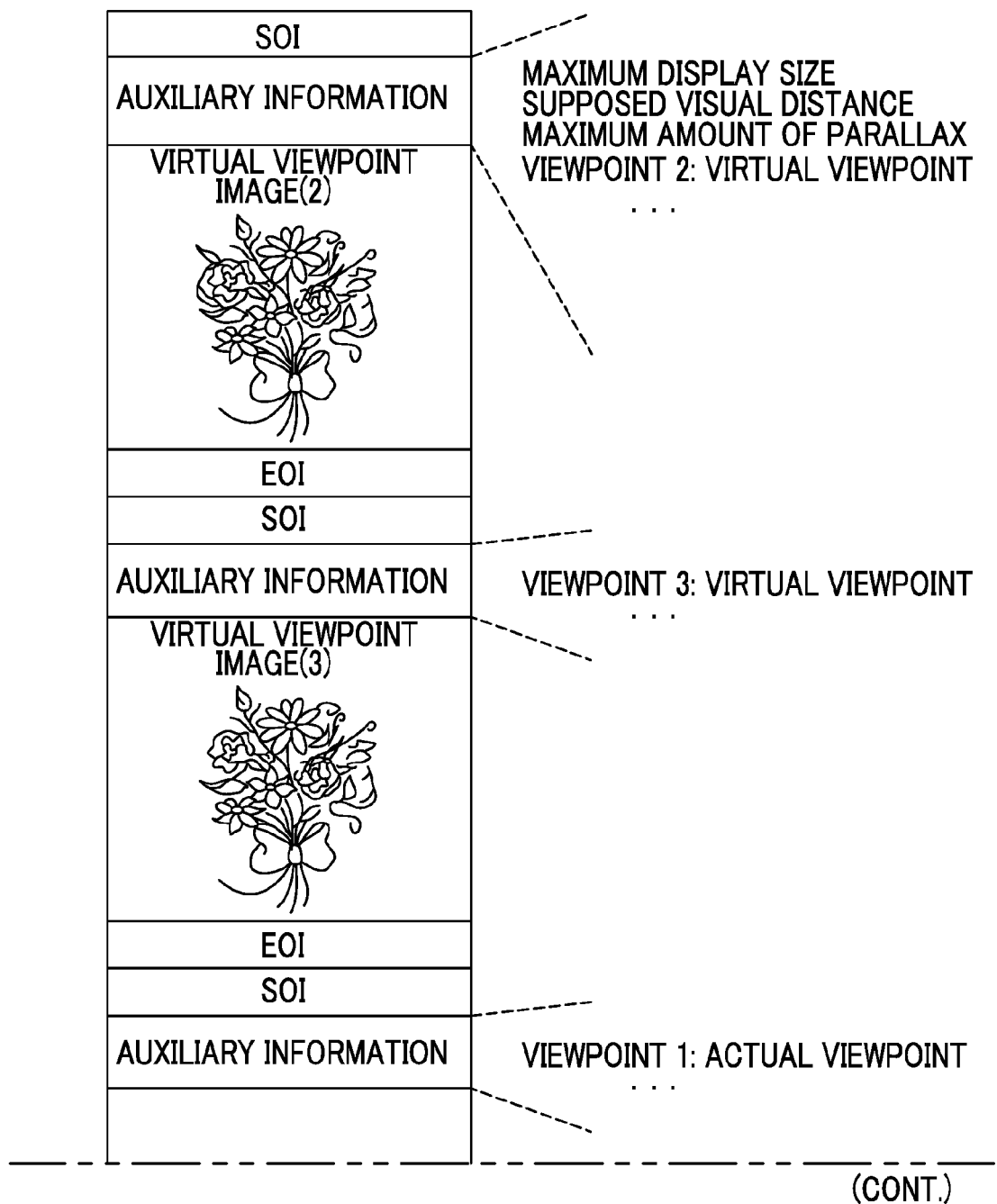
Figure 9B:
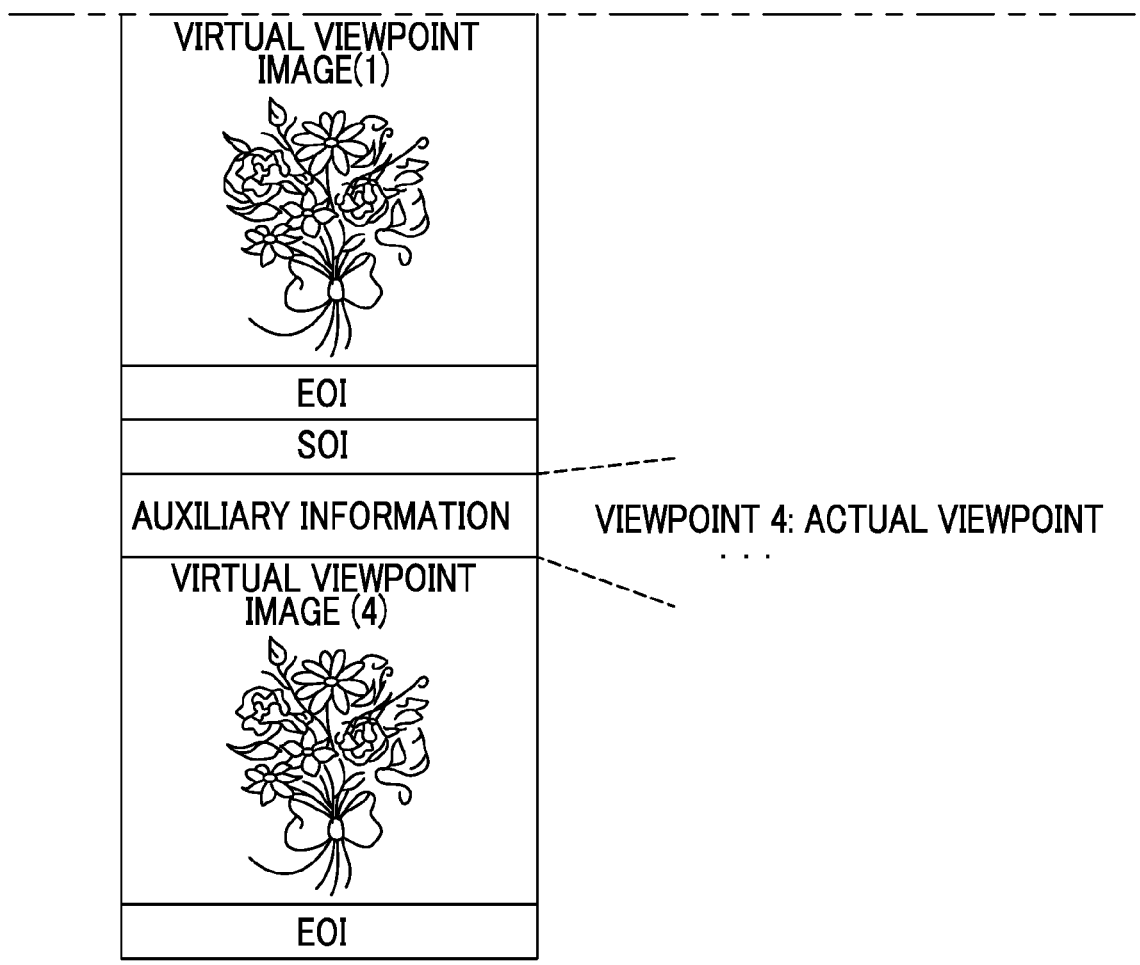

Images for display may not be provided, and only viewpoint images for printing may be recorded. In the example shown in FIG. 9B, two viewpoint images (1) and (4) actually photographed and viewpoint images (2) and (3) which are virtual viewpoint images are recorded.

The recording order may be a recommendation order of printing or display. Specifically, the viewpoint image (2) is recorded as a head image, and subsequently, the viewpoint image (3), the viewpoint image (1), and the viewpoint image (4) are recorded. As before, the viewpoint images may be recorded in an order of viewpoints.

In this way, if virtual viewpoint images are generated and recorded, it should suffice that there are two images as actual viewpoint images, making it possible to simplify and lighten an image capturing optical system of an image capturing device.

Fourth Embodiment

When a stereoscopic image based on a plurality of viewpoint images is displayed on a predetermined large-screen stereoscopic display, the amount of image deviation on the stereoscopic display corresponding to the maximum amount of parallax is calculated on the basis of the acquired maximum amount of parallax on the distant view side using image deviation amount calculation unit (an image deviation amount calculation step). If display is performed on a display of supposed size, when it is determined that the amount of parallax on the distant view side exceeds the interocular distance of the person, recording is performed after the amount of parallax of the images is adjusted using parallax displacement unit such that stereoscopic vision becomes possible even when display is performed on the display of this size (a parallax displacement step).

In this embodiment, parallax displacement is performed as the adjustment of the amount of parallax.

Figure 10:
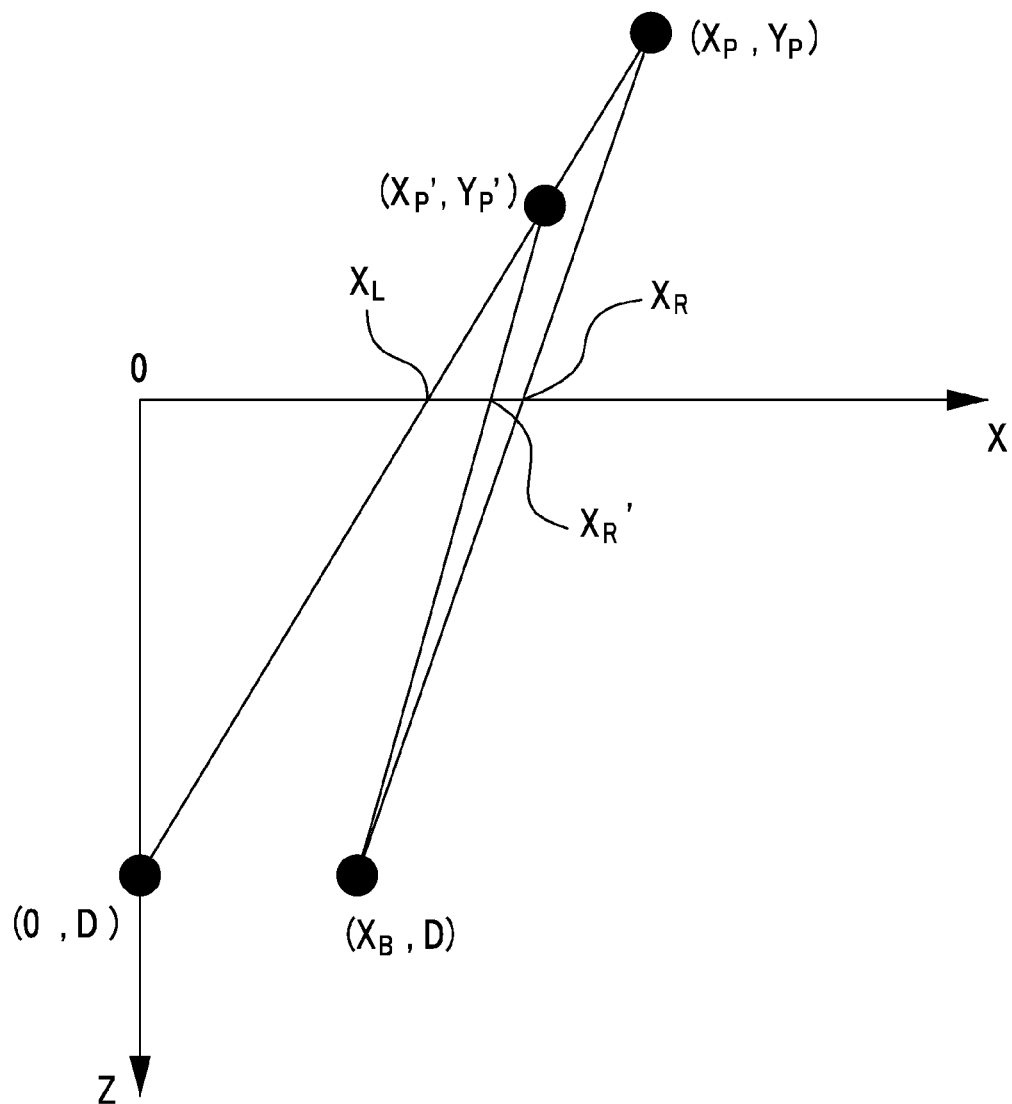
FIG. 10 is a diagram illustrating the principle of parallax displacement.
Figure 11B:
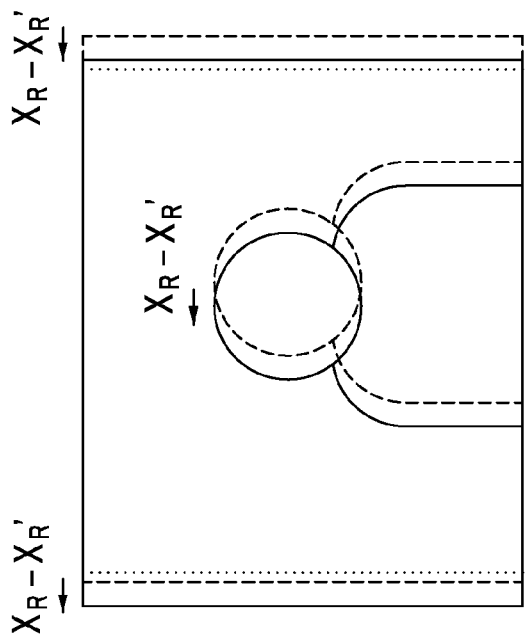
FIGS. 11A and 11B are diagrams showing left and right viewpoint images and parallax displacement.
Figure 11A:
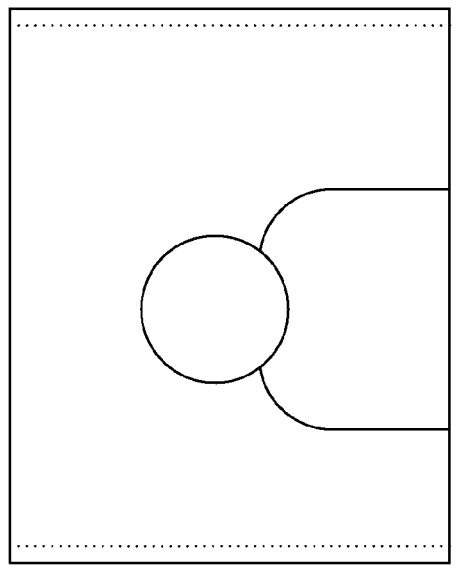

FIG. 10 is a diagram illustrating the principle of parallax displacement. FIG. 11A is a diagram showing a left viewpoint image, and FIG. 11B is a diagram showing a right viewpoint image. Here, it is assumed that the left eye of the viewer is at the coordinates $(0,D)$, and the right eye of the viewer is at the coordinates $(X_B,D)$. In the left and right viewpoint images displayed on $Z=0$, the subject displayed at the coordinates $(X_L,0)$ of the left viewpoint image and the coordinates $(X_R,0)$ of the right viewpoint image is viewed at the coordinates $(X_P,Y_P)$.

In this state, as shown in FIG. 11B, if the right viewpoint image is shifted by $X_R-X_R'$ in the left direction, as shown in FIG. 10, the coordinates of the right viewpoint image of the subject become $(X_R',0)$, and as a result, the subject is viewed at the coordinates $(X_P',Y_P')$.

In this way, if parallax displacement is performed, the adjustment of the amount of parallax can be performed.

Accordingly, if parallax displacement is performed when the amount of parallax on the distant view side exceeds the interocular distance of the person, the amount of parallax can fall within the interocular distance of the person, making it possible to appropriately perform stereoscopic vision.

Figure 12:
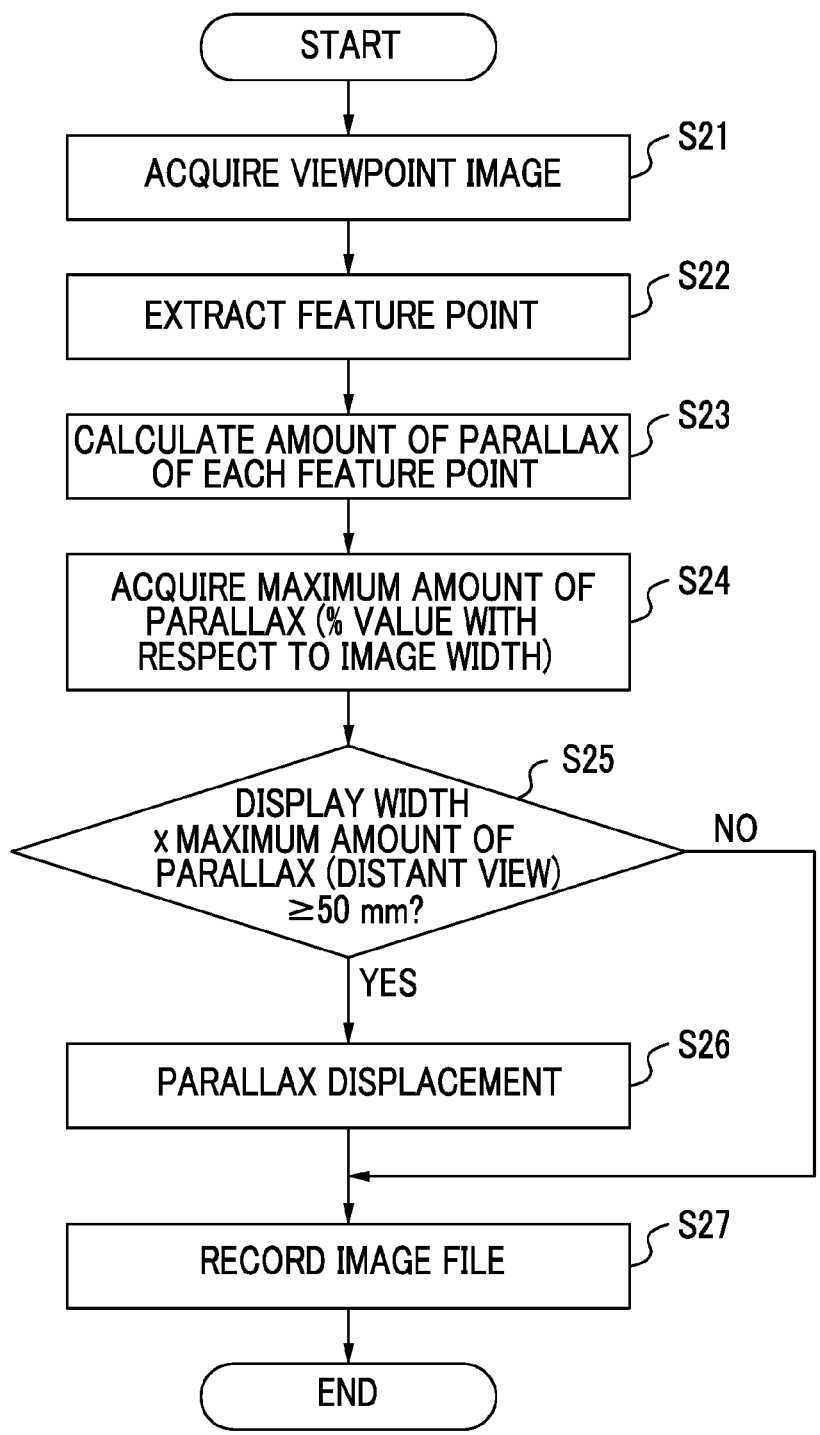
FIG. 12 is a flowchart showing photographing and recording processing.

FIG. 12 is a flowchart showing a photographing and recording principle for recording a 3D image file according to this embodiment.

First, a plurality of viewpoint images are acquired (Step S21). Here, it is assumed that two viewpoint images are photographed. Next, a plurality of feature points are extracted from each two viewpoint images (Step S22), and the amount of parallax of each feature point is calculated (Step S23). The maximum amount of parallax on the near view side and the maximum amount of parallax on the distant view side are acquired from the calculated amount of parallax of each feature point (Step S24).

Here, for a supposed display on which display is performed, the display width is acquired. The display width of the supposed display may be determined in advance and stored using storage unit, or when a 3D display is connected through an external connection terminal, such as an HDMI terminal, the size of the 3D display may be read using reading unit through communication based on the connection.

When the stereoscopic image is displayed on the display having this display width, it is determined whether or not the maximum parallax position on the distant view side can be stereoscopically viewed (Step S25). Specifically, the product of the display width and the maximum amount of parallax (%) on the distant view side is calculated, and it is determined whether or not the calculated product is equal to or greater than the interocular distance of the person, 50 mm.

When the calculated product is smaller than 50 mm, the two photographed viewpoint images are recorded directly (Step S27). For example, the viewpoint images may be recorded as the 3D image file having the data structure shown in FIG. 2, or the thumbnail images for display or virtual viewpoint images may be generated and recorded.

When the calculated product is equal to or greater than 50 mm, parallax displacement is performed such that the product becomes smaller than 50 mm and the maximum parallax position on the distant view side can be stereoscopically viewed (Step S26).

As shown in FIGS. 11A and 11B, parallax displacement may be performed by displacing the right viewpoint image in the left direction, or may be performed by displacing the left viewpoint image in the right direction. The left and right viewpoint images may be displaced in a direction in which the images are brought close to each other.

After the parallax displacement processing ends, recording is performed (Step S27). FIG. 13 is a diagram schematically showing the data structure of a 3D image file to be recorded. In the 3D image file, in addition to two photographed original images, images for display and thumbnail images obtained by reducing the size of the original images after parallax displacement are recorded. Here, the images for display are images of full HD size, and the thumbnail images are images of VGA size. The thumbnail images are used, for example, when being displayed for image search on a small liquid crystal display provided on the rear surface of the image capturing device.

As shown in FIG. 13, these images are recorded in order of the image for display of the viewpoint number 1, the image for display of the viewpoint number 2, the thumbnail image of the viewpoint number 1, the thumbnail image of the viewpoint number 2, the original image of the viewpoint number 1, and the original image of the viewpoint number 2, and the recording region of each image has an SOI marker (not shown in the drawing), an auxiliary information region, an image information region, and an EOI marker (not shown in the drawing).

First, the image for display of the viewpoint number 1 as the reference viewpoint is recorded as a head image, and in the auxiliary information region, the maximum amount of parallax is recorded.

The image for display of the viewpoint number 2 is next recorded, and this image is an image after parallax displacement is performed. In the auxiliary information region of the image for display of the viewpoint number 2, information indicating that the parallax displacement processing is completed and the shift amount (unit: pixel) are recorded.

Subsequently, the thumbnail image of the viewpoint number 1 is recorded, and in the auxiliary information region thereof, the maximum amount of parallax is recorded.

The thumbnail image of the viewpoint number 2 is further recorded. The thumbnail image may be an image after parallax displacement, or may be an image generated from the original image of the viewpoint number 2.

Thereafter, the original image of the viewpoint number 1 and the original image of the viewpoint number 2 are recorded. In the auxiliary information region of the original image of the viewpoint number 1, the maximum amount of parallax is recorded.

With this 3D image file, when being displayed on a display of supposed size, the maximum parallax position on the distant view side can be constantly stereoscopically viewed, and thus, the viewer can appropriately view stereoscopic vision.

Since the thumbnail images of VGA size are also recorded, this is effective for display during image search.

The supposed display size may be recorded in the auxiliary information region of the head image. If the supposed display size is recorded, in the stereoscopic image reproduction device, the read supposed display size is compared with the display size of the 3D display for display, thereby appropriately and easily determining whether or not stereoscopic vision is possible.

[Appearance of Stereoscopic Image Capturing Device]

Figure 14A:
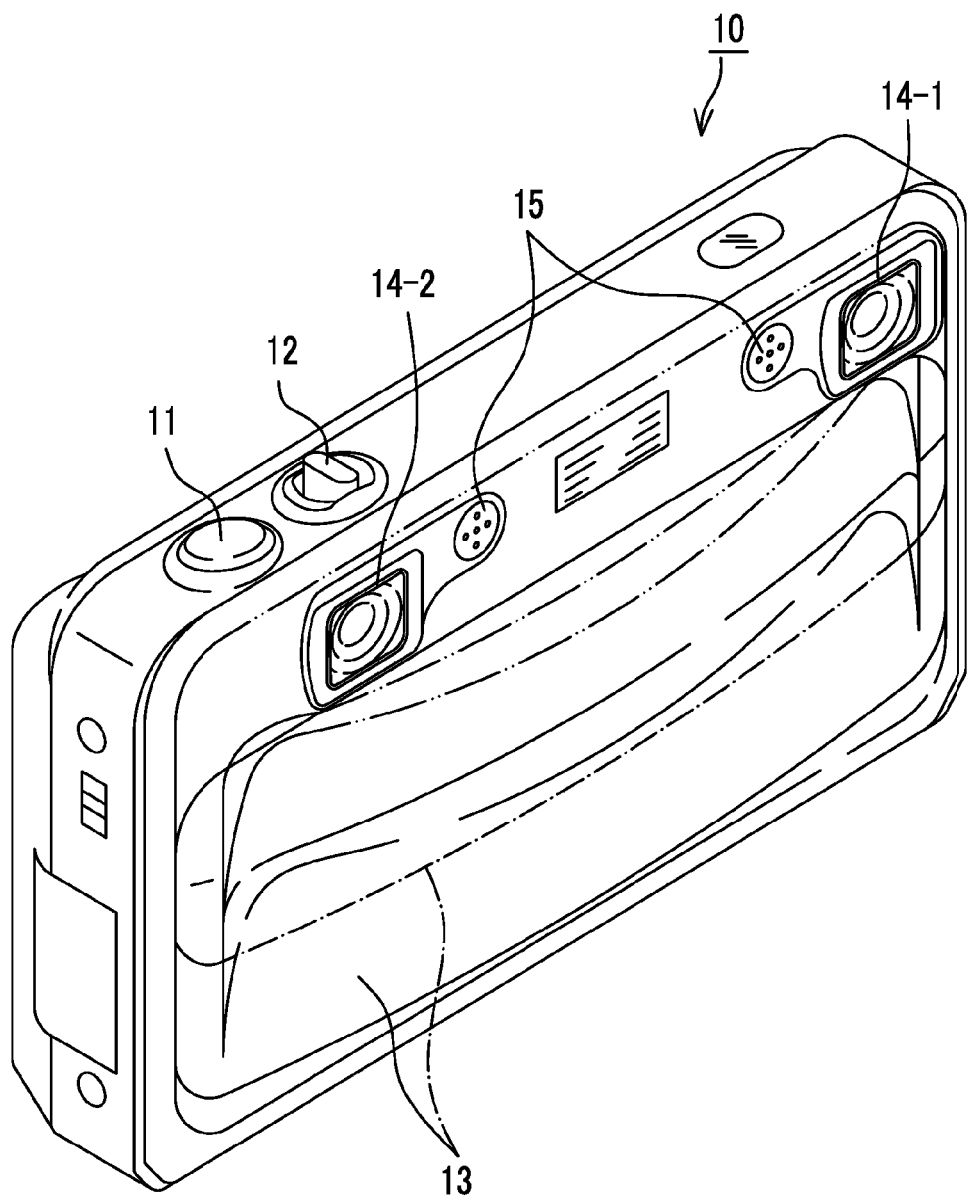
FIGS. 14A and 14B are diagrams showing the appearance of a stereoscopic image capturing device.
Figure 14B:
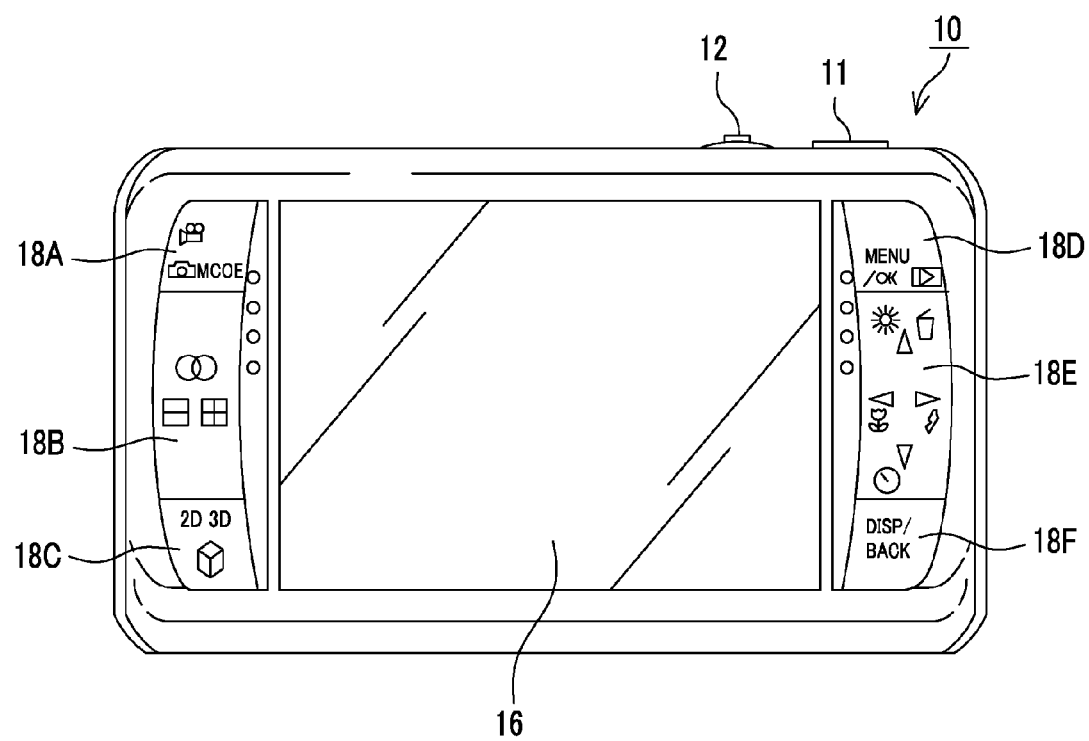

FIGS. 14A and 14B are diagrams showing the appearance of a stereoscopic image capturing device according to the invention. FIG. 14A is a perspective view when a stereoscopic image capturing device is viewed from the front side, and FIG. 14B is a rear view.

A stereoscopic image capturing device (fly-eye camera) 10 is a digital camera in which 2D/3D still images and 2D/3D motion images can be recorded. As shown in FIGS. 14A and 14B, a shutter button 11 and a zoom button 12 are provided on the top surface of a thin rectangular parallelepiped camera body.

A lens barrier 13 substantially having the same width as the width of the camera body in the left-right direction is provided on the front surface of the camera body to freely move in the up-down direction. The lens barrier 13 is moved in the up-down direction between a position indicated by a two-dot-chain line and a position indicated by a solid line to simultaneously open/close the front surfaces of a pair of left and right photographing optical systems 14-1 and 14-2. As the photographing optical systems 14-1 and 14-2, zoom lenses of bent optical systems are used. A camera power supply can be turned on/off in conjunction with the opening/closing operation of the lens front surface by the lens barrier 13.

As shown in FIG. 14B, a liquid crystal monitor 16 for 3D is provided in the center portion on the rear surface of the camera body. The liquid crystal monitor 16 can display a plurality of parallax images (right viewpoint image and left viewpoint image) as directional images having predetermined directivity by a parallax barrier. As the liquid crystal monitor 16 for 3D, a liquid crystal monitor using a lenticular lens, a liquid crystal monitor in which a right viewpoint image and a left viewpoint image can be individually viewed using dedicated glasses, such as polarization glasses or liquid crystal shutter glasses, or the like may be applied.

Various operating switches are provided on the left and right sides of the liquid crystal monitor 16. An operating switch 18A is a selector switch for switching between still image photographing and motion image photographing, an operating switch 18B is a parallax adjustment switch for adjusting the amount of parallax of a right viewpoint image and a left viewpoint image, and an operating switch 18C is a selector switch for switching between 2D imaging and 3D imaging. An operating switch 18D is a seesaw key serving as a MENU/OK button and a play button, an operating switch 18E is a multi-function cross key, and an operating key 18F is a DISP/BACK key.

The MENU/OK button is an operating switch which has a function as a menu button for giving an instruction to display a menu on the screen of the liquid crystal monitor 16 and a function as an OK button for instructing the confirmation and execution of a selected content, or the like. The play button is a button which is used for switching from a photographing mode to a reproduction mode. The cross key is an operating switch which inputs instructions in four directions of up, down, left, and right, and a macro button, a flash button, a self-timer button, and the like are assigned. When the menu is selected, the cross key functions as a switch (cursor movement operating unit) for switching an item from the menu screen or for instructing the selection of various setting items from each menu. The left/right key of the cross key functions as a frame-by-frame playback (forward/reverse playback) button in the reproduction mode. The DISP/BACK key is used to switch the display form of the liquid crystal monitor 16, to cancel an instruction content on the menu screen, to return an operation state to a previous operation state, or the like.

In FIG. 14A, reference numeral 15 denotes a stereo microphone.

[Internal Configuration of Stereoscopic Image Capturing Device]

Figure 15:
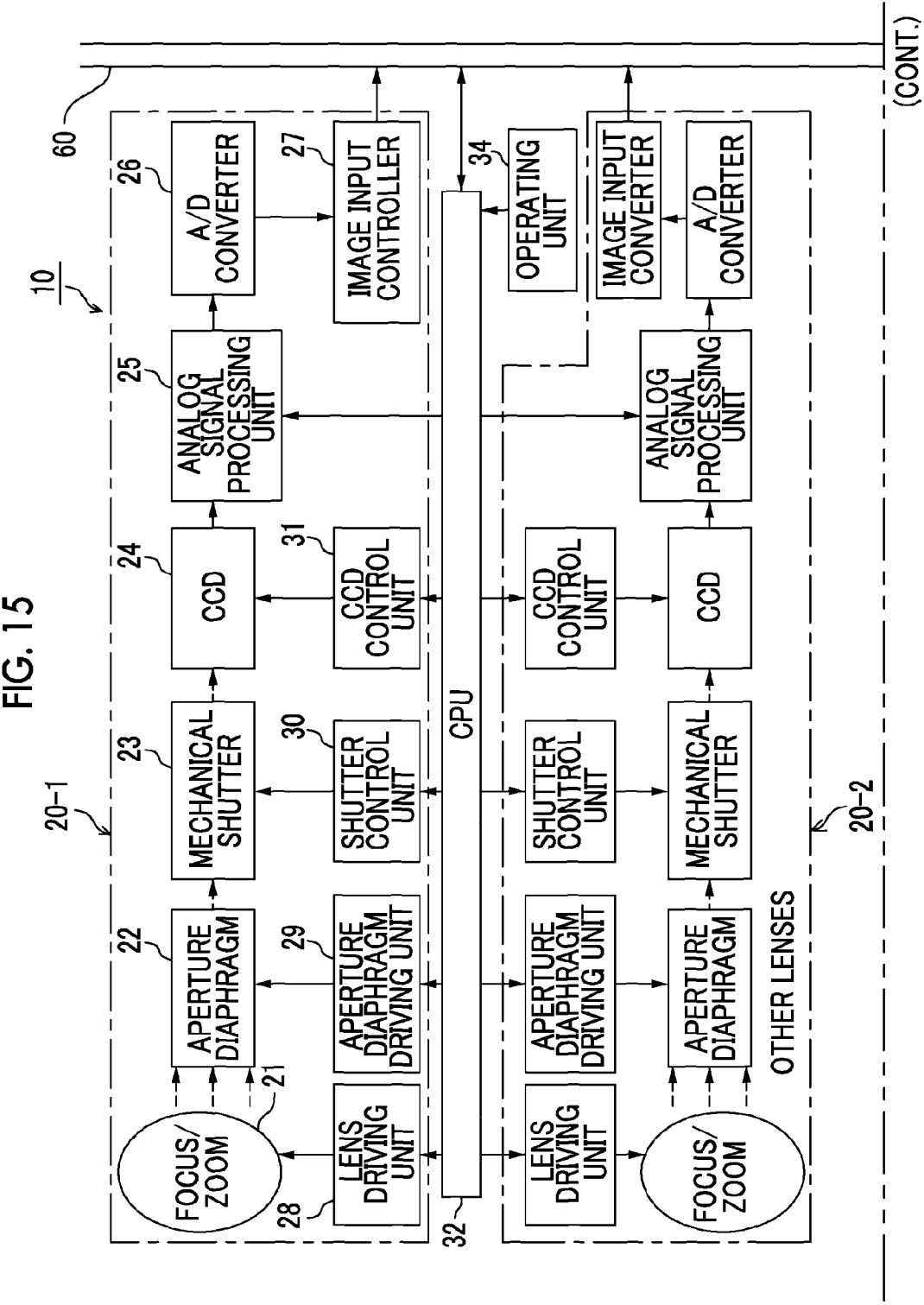
FIG. 15 is a block diagram showing the internal configuration of a stereoscopic image capturing device.
Figure 15:
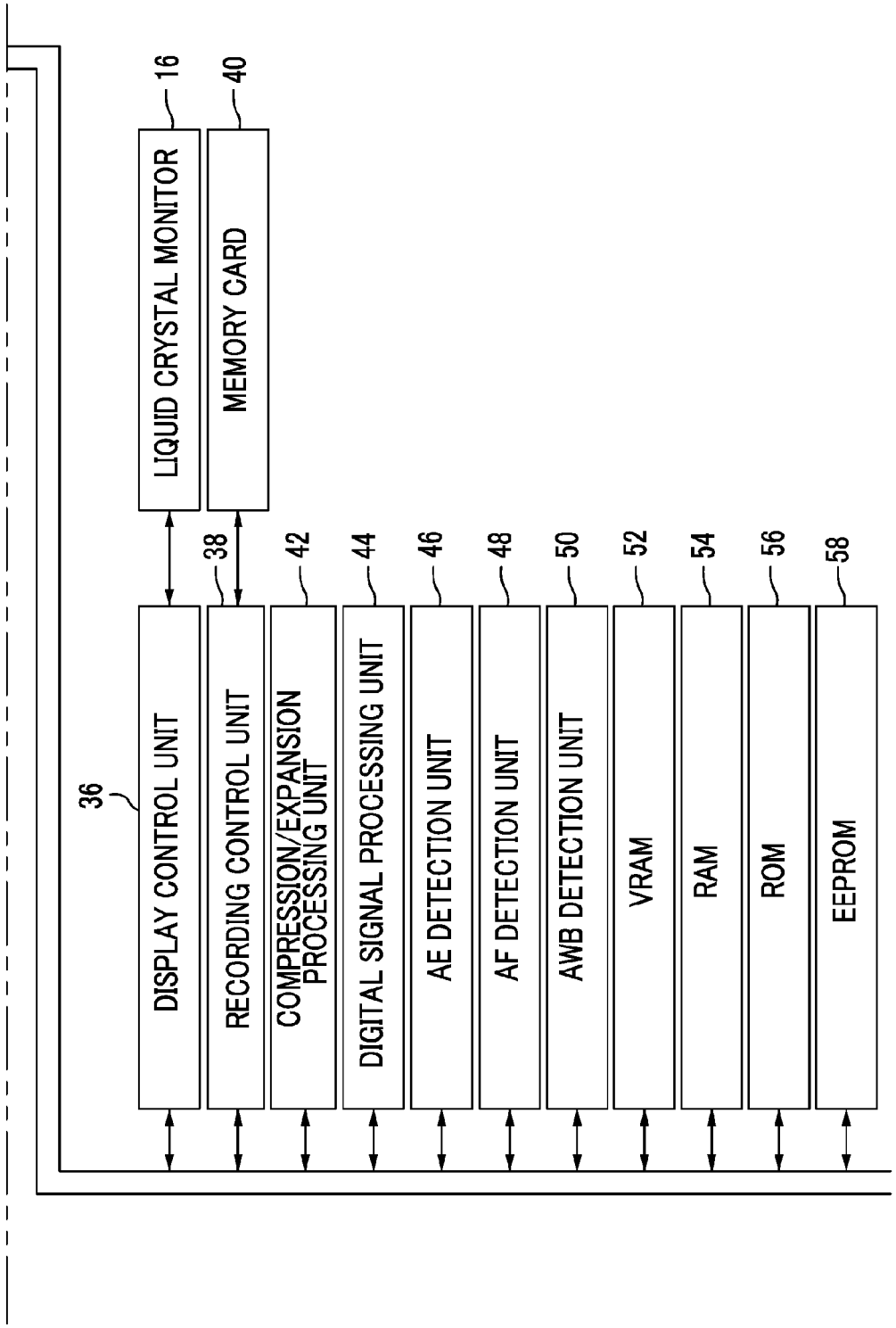

FIG. 15 is a block diagram showing the internal configuration of the stereoscopic image capturing device 10.

As shown in FIG. 15, the stereoscopic image capturing device 10 primarily has a plurality of image capturing units 20-1 and 20-2, a central processing unit (CPU) 32, an operating unit 34 including the shutter button 11 and the zoom button 12 described above and various operating switches, a display control unit 36, a liquid crystal monitor 16, a recording control unit 38, a compression/expansion processing unit 42, a digital signal processing unit 44, an AE (Automatic Exposure) detection unit 46, an AF (Auto Focus) detection unit 48, an AWB (Automatic White Balance) detection unit 50, a VRAM 52, a RANI 54, a ROM 56, an EEPROM 58, and the like. Although the image capturing units 20-1 and 20-2 capture two parallax images of an image for a left eye and an image for a right eye having parallax, three or more image capturing units 20 may be provided.

The image capturing unit 20-1 which captures the image for the left eye includes a prism (not shown), a photographing optical system 14-1 (FIGS. 14A and 14B) having a focus lens/zoom lens 21, optical units having an aperture diaphragm 22 and a mechanical shutter 23, a solid-state image capturing element (CCD) 24, an analog signal processing unit 25, an A/D converter 26, an image input controller 27, a lens driving unit 28, an aperture diaphragm driving unit 29, and a shutter control unit 30 for driving the optical units, and a CCD control unit 31 for controlling the CCD 24. The image capturing unit 20-2 which captures the image for the right eye has the same configuration as the image capturing unit 20-1 which captures the image for the left eye, thus description of a specific configuration will be omitted.

The CPU 32 performs overall control of the operation of the entire camera in accordance with a predetermined control program on the basis of an input from the operating unit 34. The calculation of the maximum display size, parallax displacement, the generation of the virtual viewpoint image, and the like are performed by the CPU 32.

The ROM 56 stores a control program executed by the CPU 32 and various kinds of data necessary for control, and the EEPROM 58 stores various kinds of information representing the adjustment result of adjustment before product shipment, for example, defective pixel information of the CCD 24, correction parameters which are used for image processing, a correspondence table of the maximum amount of parallax and the maximum display size, and the like.

The VRAM 52 is a memory which temporarily stores image data for display on the liquid crystal monitor 16, and the RAM 54 includes a computational work area of the CPU 32 and a temporary storage area of image data.

The focus lens/zoom lens 21 included in the photographing optical system is driven by the lens driving unit 28 and moves back and forth along the optical axis. The CPU 32 controls the driving of the lens driving unit 28 to control the position of the focus lens and to perform focus adjustment such that the subject comes into focus, and controls the zoom position of the zoom lens in accordance with a zoom instruction from the zoom button 12 of the operating unit 34 to change a zoom magnification.

The aperture diaphragm 22 has, for example, an iris diaphragm, and is driven and operated by the aperture diaphragm driving unit 29. The CPU 32 controls the amount (aperture value) of opening of the aperture diaphragm 22 through the aperture diaphragm driving unit 29, and controls the amount of incident light on the CCD 24.

The mechanical shutter 23 opens/closes the optical path to determine the exposure time in the CCD 24, and prevents unwanted light from being incident on the CCD 24 when reading an image signal from the CCD 24, thereby preventing the occurrence of smear. The CPU 32 outputs a shutter closing signal synchronized with the exposure end time corresponding to a shutter speed to the shutter control unit 30, and controls the mechanical shutter 23.

The CCD 24 has a two-dimensional color CCD solid-state image capturing element. Multiple photodiodes are two-dimensionally arranged on the light-receiving surface of the CCD 24, and color filters are disposed in each photodiode with a predetermined arrangement.

The optical image of the subject focused on the CCD light-receiving surface through the optical units having the above-described configuration is converted to a signal charge according to the amount of incident light by the photodiodes. The signal charges accumulated in each photodiode are sequentially read from the CCD 24 as a voltage signal (image signal) according to the signal charges in accordance with an instruction of the CPU 32 on the basis of a driving pulse from the CCD control unit 31. The CCD 24 has an electronic shutter function, and controls a charge accumulation time into the photodiode to control the exposure time (shutter speed). The charge accumulation start time corresponding to the shutter speed is controlled by the electronic shutter, and the mechanical shutter 23 is closed to control the exposure end time (charge accumulation end time). Although in this embodiment, the CCD 24 is used as an image capturing element, an image capturing element having a different configuration, such as a CMOS sensor, may be used.

R, and B analog signals read from the CCD 24 are subjected to double-correlated sampling (CDS) or amplification by the analog signal processing unit 25, and converted to R, G, and B digital signals by the A/D converter 26.

The image input controller 27 has an internal line buffer of a predetermined capacity, temporarily accumulates R, $C_3$ and B image signals (CCD RAW data) A/D converted by the A/D converter 26, and stores the R, and B image signals in the RAM 54 through a bus 60.

In a 3D image capturing mode, the CPU 32 controls the image capturing unit 20-2 which captures the right viewpoint image in the same manner as the image capturing unit 20-1 which captures the left viewpoint image.

The AE detection unit 46 calculates subject luminance necessary for AE control on the basis of the image signals introduced when the shutter button 11 is half-pressed, and outputs a signal representing subject luminance (photographing EV value) to the CPU 32. The CPU 32 sets the shutter speed (exposure time), the aperture value, and photographing sensitivity in a plurality of image capturing units 20-1 and 20-2 in accordance with a predetermined program diagram on the basis of the input photographing EV value.

The AF detection unit 48 integrates the absolute value of a high-frequency component of an image signal of an AF area introduced when the shutter button 11 is half-pressed, and outputs the integrated value (AF evaluation value) to the CPU 32. The CPU 32 moves the focus lens from a close range side to an infinite side, searches for a focusing position where the AF evaluation value detected by the AF detection unit 48 is maximal, and moves the focus lens to the focusing position, thereby performing focus adjustment on the subject (main subject). During motion image photographing, so-called mountain-climbing control is performed to move the focus lens such that the AF evaluation value constantly has the maximum value.

The AWB detection unit 50 automatically obtains a light source type (color temperature of field) on the basis of the R, G, and B image signals acquired during this image capturing, and reads a corresponding white balance gain from a table which stores R, G, and B white balance gains (white balance correction values) according to the light source type in advance.

The digital signal processing unit 44 includes a white balance correction circuit, a gradation conversion processing circuit (for example, a gamma correction circuit), a synchronization circuit which interpolates spatial deviations of color signals of R, G, B, and the like depending on the color filter arrangement of a single-plate CCD to position the color signals, a contour correction circuit, a luminance/color difference signal generation circuit, and the like, and performs image processing on the R, G, and B image signals (CCD RAW data) stored in the RAM 54. That is, R, G, and B CCD RAW data are subjected to white balance correction by multiplying the white balance gains detected by the AWB detection unit 50 in the digital signal processing unit 44, then subjected to the predetermined processing, such as gradation conversion processing (for example, gamma correction), and converted to YC signals having a luminance signal (Y signal) and a color-difference signal (Cr and Cb signals). The YC signals processed by the digital signal processing unit 44 are stored in the RAM 54.

The digital signal processing unit 44 also includes a distortion correction circuit which corrects lens distortion of the photographing optical systems of a plurality of image capturing units 20-1 and 20-2, and an image clipping circuit which clips images of predetermined clipping areas from the left and right viewpoint images to correct optical axis deviations of the photographing optical systems of a plurality of image capturing units 20-1 and 20-2.

The compression/expansion processing unit 42 compresses the YC signals stored in the RAM 54 in accordance with an instruction from the CPU 32 during recording in a memory card 40, or expands compressed data recorded in the memory card 40 to obtain the YC signals.

The recording control unit 38 converts compressed data compressed by the compression/expansion processing unit 42 to an image file of a predetermined format (for example, a 3D still image becomes an MP file, and a 3D motion image becomes a motion image file of motion JPEG H.264, MPEG4, or MPEG4-MVC), records the image file in the memory card 40, or reads an image file from the memory card 40.

The recording control unit 38 records the maximum display size, the supposed visual distance, the maximum amount of parallax (near view) (%), the maximum amount of parallax (distant view) (%), and the like as auxiliary information in the memory card 40 along with Exif auxiliary information, when recording an MP file according to the invention.

The liquid crystal monitor 16 is used as an image display unit which displays photographed images, and is also used as a GUI (Graphical User Interface) during various settings. The liquid crystal monitor 16 is also used as an electronic viewfinder which displays live view images (hereinafter, referred to as "through images" for confirming an image angle in the photographing mode. When a 3D image is displayed on the liquid crystal monitor 16, the display control unit 36 alternately displays a left viewpoint image and a right viewpoint image held in the VRAM 52 pixel by pixel. With the parallax barrier provided in the liquid crystal monitor 16, left and right images alternately arranged pixel by pixel are separately viewed by the left and right eyes of the user who observes at a predetermined distance. Accordingly, stereoscopic vision is possible.

With the stereoscopic image capturing device 10 configured as above, the embodiment can be realized. Although the stereoscopic image capturing device 10 described herein includes the two image capturing units for photographing images of left and right two viewpoints, three or more image capturing units may be provided to photograph three or more viewpoint images. For example, four image capturing units, such as the four image capturing devices 101-1 to 101-4 shown in FIG. 5, may be provided to photograph four viewpoint images.

What is claimed is:
1. A stereoscopic image capturing device comprising:
image capturing unit for acquiring a plurality of viewpoint images of the same subject from a plurality of viewpoints;
parallax amount calculation unit for calculating the amount of parallax representing the amount of deviation between feature points having common features from the plurality of acquired viewpoint images;
maximum parallax amount acquisition unit for acquiring the maximum amount of parallax on a distant view side from the calculated amount of parallax of each feature point;
maximum display size acquisition unit for acquiring the maximum display size enabling binocular fusion when a stereoscopic image based on the plurality of viewpoint images is displayed on a stereoscopic display on the basis of the acquired maximum amount of parallax on the distant view side;

recording unit for generating a three-dimensional image file in which the plurality of viewpoint images are recorded, and recording the three-dimensional image file in a recording medium, the recording unit recording the plurality of viewpoint images in the three-dimensional image file and recording the maximum amount of parallax on the distant view side and the maximum display size in the three-dimensional image file as auxiliary information;

representative image setting unit for setting one of N (N is an integer equal to or greater than 3) viewpoint images acquired by the image capturing unit as a representative image; and display image generation unit for generating display images of image size smaller than the viewpoint images on the basis of the N viewpoint images, wherein the maximum parallax amount acquisition unit acquires (N−1) maximum amount of parallax on the distant view side in association with two images of different combinations of the representative image and (N−1) viewpoint images other than the representative image from the N images, the maximum display size acquisition unit acquire (N−1) maximum display sizes on the basis of the acquired (N−1) maximum amount of parallax on the distant view side, the recording unit records the acquired (N−1) maximum amount of parallax and maximum display sizes on the distant view side in the three-dimensional image file as the auxiliary information, and the recording unit records the display images in the three-dimensional image file.

2. A stereoscopic image capturing device comprising:

image capturing unit for acquiring a plurality of viewpoint images of the same subject from a plurality of viewpoints;

parallax amount calculation unit for calculating the amount of parallax representing the amount of deviation between feature points having common features from the plurality of acquired viewpoint images;

maximum parallax amount acquisition unit for acquiring the maximum amount of parallax on a distant view side from the calculated amount of parallax of each feature point;

maximum display size acquisition unit for acquiring the maximum display size enabling binocular fusion when a stereoscopic image based on the plurality of viewpoint images is displayed on a stereoscopic display on the basis of the acquired maximum amount of parallax on the distant view side; and recording unit for generating a three-dimensional image file in which the plurality of viewpoint images are recorded, and recording the three-dimensional image file in a recording medium, the recording unit recording the plurality of viewpoint images in the three-dimensional image file and recording the maximum amount of parallax on the distant view side and the maximum display size in the three-dimensional image file as auxiliary information;

virtual viewpoint image generation unit for generating one or a plurality of virtual viewpoint images corresponding to an arbitrary virtual viewpoint on the basis of at least one viewpoint image of the plurality of viewpoint images acquired by the image capturing unit and the amount of parallax calculated by the parallax amount calculation unit; and representative image setting unit for setting one of N images of the plurality of viewpoint images and the virtual viewpoint images as a representative image, wherein the maximum parallax amount acquisition unit acquires (N−1) maximum amount of parallax on the distant view side in association with two images of different combinations of the representative image and (N−1) images other than the representative image from the N images, the maximum display size acquisition unit acquire (N−1) maximum display sizes on the basis of the acquired (N−1) maximum amount of parallax on the distant view side, and the recording unit records the acquired (N−1) maximum amount of parallax and maximum display sizes on the distant view side in the three-dimensional image file as the auxiliary information.

3. The stereoscopic image capturing device according to claim 2, further comprising:

display image generation unit for generating display images of image size smaller than the viewpoint images and the virtual viewpoint images on the basis of the plurality of viewpoint images and the virtual viewpoint images, wherein the recording unit records the plurality of viewpoint images and at least one of the virtual viewpoint images and the display images in the three-dimensional image file.

4. The stereoscopic image capturing device according to claim 2, wherein the recording unit records viewpoint information representing whether each image is an image of an actual viewpoint or an image of a virtual viewpoint as the auxiliary information of the three-dimensional image file when recording the plurality of viewpoint images and the virtual viewpoint images in the three-dimensional image file.

* * * * *